United States Patent
Li

(10) Patent No.: US 10,523,664 B2
(45) Date of Patent: Dec. 31, 2019

(54) METHOD AND DEVICE FOR AUTHENTICATION USING DYNAMIC PASSWORDS

(71) Applicant: Alibaba Group Holding Limited, George Town (KY)

(72) Inventor: Zeyang Li, Hangzhou (CN)

(73) Assignee: Alibaba Group Holding Limited (KY)

( * ) Notice: Subject to any disclaimer, the term of this patent is extended or adjusted under 35 U.S.C. 154(b) by 151 days.

(21) Appl. No.: 15/201,084

(22) Filed: Jul. 1, 2016

(65) Prior Publication Data

US 2017/0012969 A1     Jan. 12, 2017

(30) Foreign Application Priority Data

Jul. 8, 2015   (CN) .......................... 2015 1 0397391

(51) Int. Cl.
*H04L 29/06*     (2006.01)
*H04W 12/06*     (2009.01)
*G06F 21/34*     (2013.01)
*H04L 9/08*      (2006.01)
*H04L 9/32*      (2006.01)
*H04W 12/00*     (2009.01)

(52) U.S. Cl.
CPC .......... *H04L 63/0838* (2013.01); *G06F 21/34* (2013.01); *H04L 9/0866* (2013.01); *H04L 9/3228* (2013.01); *H04W 12/06* (2013.01); *H04L 63/0846* (2013.01); *H04W 12/00512* (2019.01)

(58) Field of Classification Search
None
See application file for complete search history.

(56) References Cited

U.S. PATENT DOCUMENTS 6,904,526 B1   6/2005  Hongwei
8,117,458 B2   2/2012  Osborn, III et al.
              (Continued)

FOREIGN PATENT DOCUMENTS

CN     101778381     7/2010
CN     103023876     4/2013
              (Continued)

OTHER PUBLICATIONS

Bittl, Sebastian. Efficient Construction of Infinite Length Hash Chains with Perfect Forward Secrecy Using Two Independent Hash Functions. 2014 11th International Conference on Security and Cryptography (SECRYPT). https://ieeexplore.ieee.org/stamp/stamp.jsp?tp=&arnumber=7509492 (Year: 2014).*
              (Continued)

*Primary Examiner* — Jeremiah L Avery
(74) *Attorney, Agent, or Firm* — Van Pelt, Yi & James LLP

(57) ABSTRACT

Embodiments of the present application relate to a method and device for authentication processing. The method includes obtaining an equipment code that uniquely identifies a terminal, generating a dynamic password based at least in part on the equipment code and an output value of a counter, wherein the dynamic password is a basis for authentication of the terminal by a server, and sending the dynamic password to the server, wherein the server authenticates the dynamic password.

22 Claims, 13 Drawing Sheets

(56) References Cited

U.S. PATENT DOCUMENTS

| | | | |
|---|---|---|---|
| 8,132,243 B2 | 3/2012 | Bychkov | |
| 8,312,519 B1* | 11/2012 | Bailey | H04L 9/003 380/255 |
| 8,838,973 B1* | 9/2014 | Yung | H04L 63/1483 713/165 |
| 9,380,026 B2 | 6/2016 | Baca | |
| 9,654,466 B1* | 5/2017 | Wu | H04L 63/0428 |
| 2003/0204732 A1 | 10/2003 | Audebert et al. | |
| 2004/0172535 A1 | 9/2004 | Jakobsson et al. | |
| 2004/0181696 A1 | 9/2004 | Walker | |
| 2005/0124288 A1* | 6/2005 | Karmi | H04L 12/5692 455/3.01 |
| 2005/0144484 A1 | 6/2005 | Wakayama | |
| 2006/0288230 A1* | 12/2006 | Crall | H04L 9/083 713/183 |
| 2007/0033642 A1* | 2/2007 | Ganesan | H04L 63/0428 726/10 |
| 2007/0165582 A1* | 7/2007 | Batta | H04L 63/0823 370/338 |
| 2007/0186115 A1* | 8/2007 | Gao | H04L 63/0846 713/184 |
| 2007/0260556 A1* | 11/2007 | Pousti | G06Q 20/14 705/75 |
| 2009/0045253 A1* | 2/2009 | Han | G06F 21/31 235/380 |
| 2009/0313687 A1* | 12/2009 | Popp | H04L 9/3228 726/9 |
| 2010/0120409 A1 | 5/2010 | Shieh et al. | |
| 2010/0253470 A1* | 10/2010 | Burke | G06K 9/00885 340/5.82 |
| 2011/0047608 A1 | 2/2011 | Levenberg | |
| 2011/0072499 A1 | 3/2011 | Lin | |
| 2012/0142329 A1* | 6/2012 | Cardina | H04W 8/22 455/418 |
| 2012/0185398 A1 | 7/2012 | Weis et al. | |
| 2012/0204032 A1 | 8/2012 | Wilkins et al. | |
| 2012/0278871 A1 | 11/2012 | Wang | |
| 2013/0227661 A1 | 8/2013 | Gupta et al. | |
| 2013/0268444 A1* | 10/2013 | Namgoong | G06Q 20/40145 705/71 |
| 2014/0040628 A1* | 2/2014 | Fort | G06F 21/34 713/182 |
| 2015/0012981 A1* | 1/2015 | Ehrensvard | G06F 21/34 726/5 |
| 2015/0082399 A1* | 3/2015 | Wu | G06F 21/6209 726/6 |

FOREIGN PATENT DOCUMENTS

| | | |
|---|---|---|
| EP | 1804418 | 7/2007 |
| EP | 1924047 | 5/2008 |
| GB | 2510120 | 7/2014 |
| JP | 2001067320 A | 3/2001 |
| JP | 2002297547 A | 10/2002 |
| JP | 2014096101 A | 5/2014 |
| JP | 2015072511 A | 4/2015 |

OTHER PUBLICATIONS

Kumari, C. Shyamala; Rani, M. Deepa. Hacking Resistance Protocol for Securing Passwords Using Personal Device. 2013 7th International Conference on Intelligent Systems and Control (ISCO). https://ieeexplore.ieee.org/stamp/stamp.jsp?tp=&arnumber=6481198 (Year: 2013).*

Singh, Mahima; Garg, Deepak. Choosing Best Hashing Strategies and Hash Functions. 2009 IEEE International Advance Computing Conference. https://ieeexplore.ieee.org/stannp/stannp.jsp?tp=&arnumber=4808979 (Year: 2009).*

Saeed, Maryann et al. A Secure Two-Party Password-Authenticated Key Exchange Protocol. Proceedings of the 2014 IEEE 15th International Conference on Information Reuse and Integration (IEEE IRI 2014). https://ieeexplore.ieee.org/stamp/stamp.jsp?tp=&arnumber=7051926 (Year: 2014).*

Nicanfar, Hasen et al. Efficient Authentication and Key Management Mechanisms for Smart Grid Communications. IEEE Systems Journal, vol. 8, Issue: 2. https://ieeexplore.ieee.org/stannp/stannp.jsp?tp=&arnunnber=6553352 (Year: 2014).*

* cited by examiner

300

METHOD AND DEVICE FOR AUTHENTICATION USING DYNAMIC PASSWORDS

CROSS REFERENCE TO OTHER APPLICATIONS

This application claims priority to People's Republic of China Patent Application No. 201510397391.X entitled A TERMINAL AUTHENTICATION PROCESSING, AUTHENTICATION METHODS AND DEVICE, SYSTEM filed Jul. 8, 2015 which is incorporated herein by reference for all purposes.

FIELD OF THE INVENTION

The present invention relates to the field of authentication. In particular, the present application relates to a method, a device, and system for authentication using a dynamic password.

BACKGROUND OF THE INVENTION

Dynamic passwords are combinations of time-related, unpredictable random numbers generated at fixed intervals based on a dedicated algorithm. Generally, each password can only be used once in a system that performs authentication using dynamic passwords. With the ability to effectively protect the security of transaction and log-on authentication, the use of dynamic passwords in connection with an authentication system causes the need to change passwords on a regular basis to be unnecessary, thereby reducing security worries. The use of dynamic passwords is particularly effective in internal corporate environments. Dynamic passwords can be realized on dedicated hardware, and/or by software.

According to conventional authentication systems that use dynamic passwords, when a user logs in, the user is required to enter the dynamic password in the user interface in order to complete log-on authentication. However, such conventional dynamic password authentication methods have several deficiencies, namely, such methods require that additional hardware devices, which are relatively costly and easily lost, be carried; the dynamic passwords must be entered manually, thereby creating the possibility of input errors; and when the software version system time updates, the update can result in verification failure.

Therefore, there is a need for a more effective authentication method, device, and system that uses a dynamic password for authentication.

BRIEF DESCRIPTION OF THE DRAWINGS

Various embodiments of the invention are disclosed in the following detailed description and the accompanying drawings.

The drawings described here are intended to further the understanding of the present invention and form a part of the present application. The exemplary embodiments of the present invention and the descriptions thereof are intended to explain the present invention and do not constitute inappropriate limitation of the present invention. Among the drawings.

Figure 1:
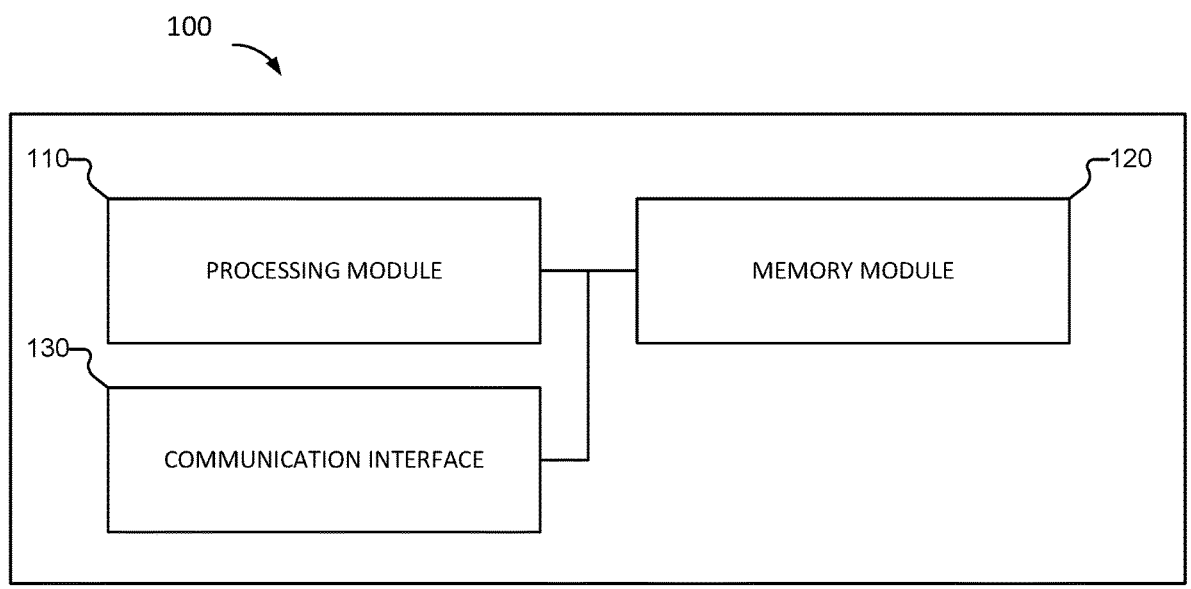
FIG. 1 is a block diagram of a device for authentication processing according to various embodiments of the present disclosure.

The same or similar marks in the drawings represent same or similar components.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, a terminal generally refers to a device used (e.g., by a user) within a network system and used to communicate with one or more servers. According to various embodiments of the present disclosure, a terminal includes components that support communication functionality. For example, a terminal can be a smart phone, a tablet device, a mobile phone, a video phone, an e-book reader, a desktop computer, a laptop computer, a netbook computer, a Personal Digital Assistant (PDA), a Portable Multimedia Player (PMP), an mp3 player, a mobile medical device, a camera, a wearable device (e.g., a Head-Mounted Device (HIVID), electronic clothes, electronic braces, an electronic necklace, an electronic accessory, an electronic tattoo, or a smart watch), a smart home appliance, or the like. In some embodiments, a web browser and/or a standalone application is installed at each terminal, enabling a user to access a service (e.g., an e-commerce website) hosted by one or more servers.

Authentication processing is described. Authentication processing can, for example, be executed on a computer system using a set of computer-executable commands, and, although a logical sequence is shown in processes 200 of FIG. 2, 300 of FIG. 3A, 350 of FIG. 3B, 600 of FIG. 6, under certain circumstances, the elements of such methods as shown or described can be executed in a sequence different from the sequence illustrated in FIGS. 2, 3A, 3B, and 6.

FIG. 1 is a block diagram of a device for authentication processing according to various embodiments of the present disclosure.

Figure 2:
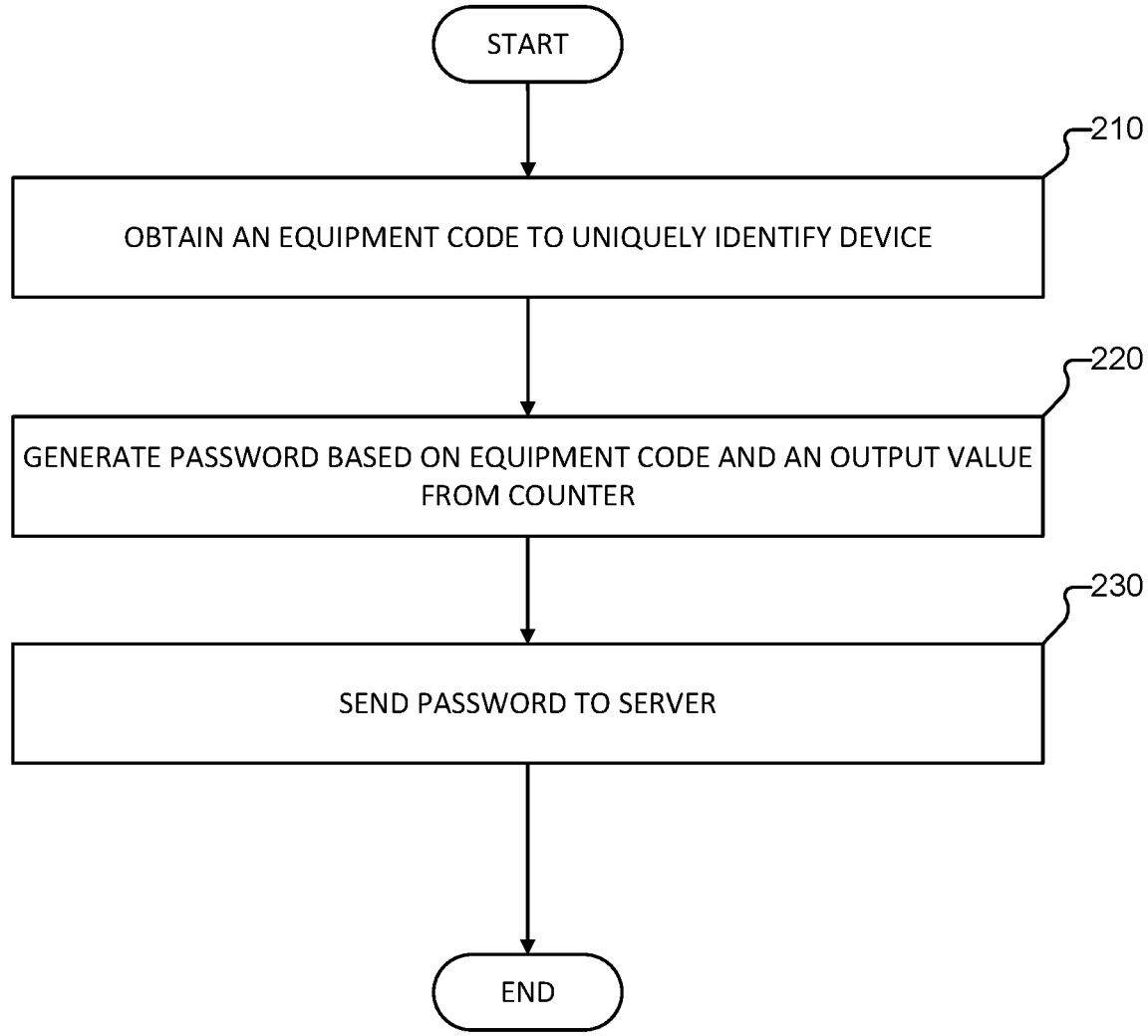
FIG. 2 is a flowchart of a method for authentication processing according to various embodiments of the present disclosure.
Figure 3A:
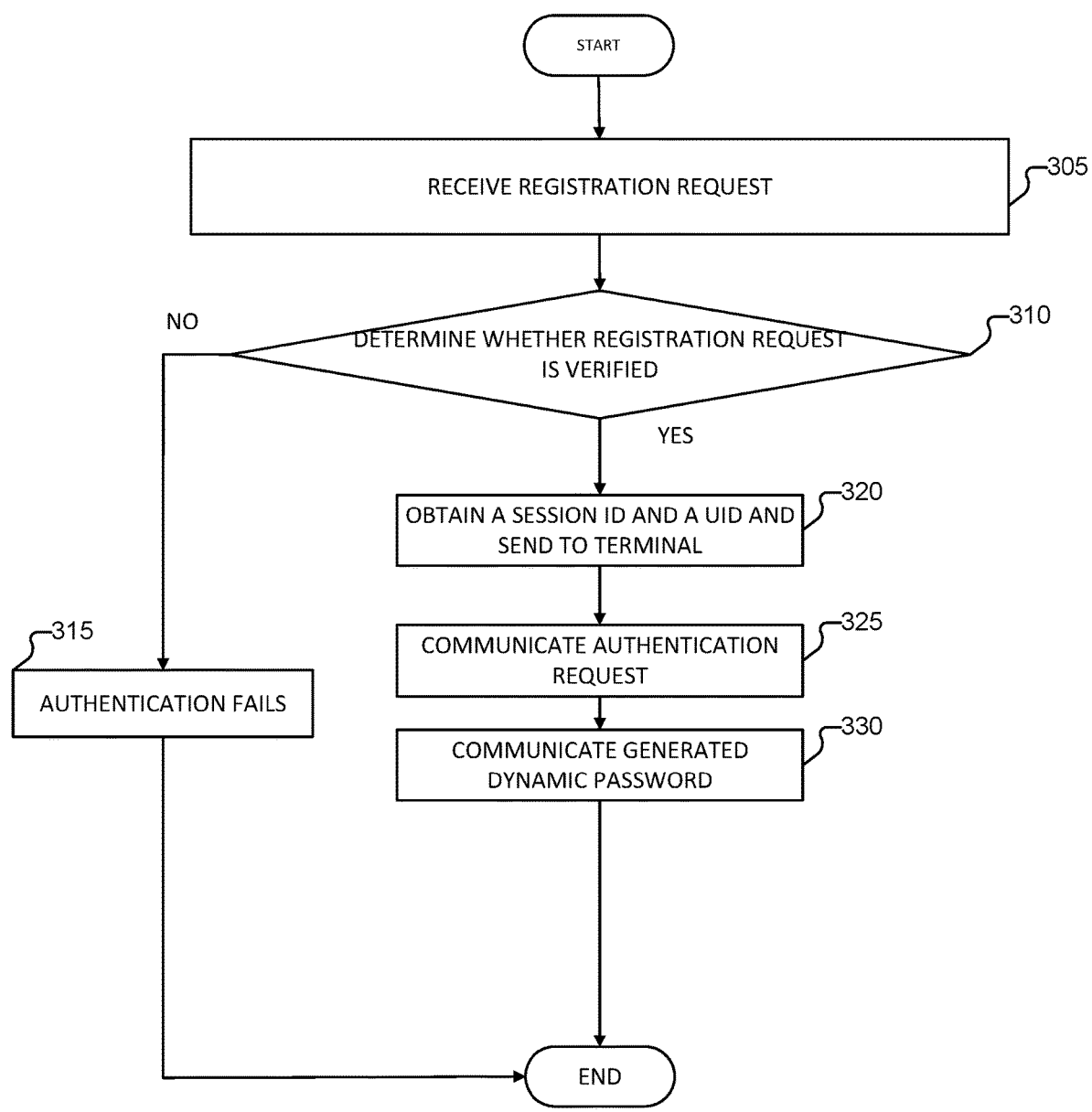
FIG. 3A is a flowchart of a method for authentication processing according to various embodiments of the present disclosure.

Referring to FIG. 1, device 100 can be implemented in connection with process 200 of FIG. 2, or process 300 of FIG. 3A. Device 100 can be implemented in connection with system 1000 of FIG. 10, computer terminal 1100 of FIG. 11, or computer system 1200 of FIG. 12. Device 100 can be included in, or otherwise correspond to, a mobile terminal, a computer terminal, or similar operating device.

As illustrated in FIG. 1, device 100 can include processor 110, a memory 120, and a communication interface 130.

The processor 110 can include one or more computer processors. The processor 110 may comprise, but is not limited to, such processing devices as central processing units (CPUs), microprocessors (MCUs), field programmable logic devices (FPGAs), application specific integrated circuits (ASICs), or the like.

The memory 120 is configured to store data. In some embodiments, the memory 120 can store software programs and modules of the application software, for example, for the program commands/modules corresponding to the authentication processing methods according to various embodiments. For example, the memory 120 can store software programs or instructions comprising process 200 of FIG. 2, process 300 of FIG. 3A, or process 350 of FIG. 3B. The processor 110 can store software code and modules in the memory 120 in the course of operation, and can accordingly execute various functional applications and data processing, thus realizing vulnerability detection of the aforesaid application program. The memory 120 can comprise random access memory. The memory 120 can also comprise non-volatile memory, such as one or more magnetic storage devices, flash memory, or other non-volatile solid-state memory. In some embodiments, the memory 120 can be, or otherwise comprise memory that is, remotely disposed relative to the processor 110. For example, such remote memory can be connected to the processor 110 (e.g., device 100) via a network. Examples of the aforesaid network comprise but are not limited to the Internet, corporate intranets, local area networks, wide area networks, mobile communication networks, and combinations thereof.

The communication interface 130 is used to communicate data (e.g., receive and/or transmit data) over a network. Specific examples of the aforesaid network may comprise wireless networks provided by communication providers for the device 100. In some embodiments, the communication interface 130 comprises a network interface controller (NIC), which can link to other network equipment via a base station, and thereby communicate with the Internet. In some embodiments, the communication interface 130 is a radio frequency (RF) module which can communicate wirelessly with one or more other devices, the Internet, or the like.

FIG. 2 is a flowchart of a method for authentication processing according to various embodiments of the present disclosure.

Referring to FIG. 2, process 200 for authentication processing is provided. Process 200 can be implemented by, for example, device 100 of FIG. 1, system 900 of FIG. 9, system 1000 of FIG. 10, or computer system 1200 of FIG. 12.

At 210, an equipment code is obtained. The equipment code can uniquely identify a device or terminal. In some embodiments, the terminal retrieves an equipment code used to uniquely identify the terminal. In some embodiments, device 100 can obtain the equipment code associated therewith. The equipment code can be set by a manufacturer and stored in memory (e.g., the memory 120), and retrieved using a special application programming interface (API) call or other appropriate function call. In some embodiments, the equipment code can be generated by using some characteristic parameters of the equipment itself according to a preset equipment code determination process. In some embodiments, the equipment code can be stored in, for example, the memory or storage of the equipment.

The equipment code corresponds to, or be generated based at least in part on one or more of the terminal serial number, the international mobile equipment identity (IMEI), the international mobile subscriber identity (IMSI), the media access control (MAC) address, or the operating system ID. In some embodiments, the equipment code can be generated based at least in part on the terminal's characteristic parameters in accordance with a predefined process. For example, the characteristic parameters with which the equipment code can be generated based at least in part, can include on one or more of a brand of the terminal, the model number of the terminal, the terminal serial number, the international mobile equipment identity (IMEI), the international mobile subscriber identity (IMSI), the media access control (MAC) address, the operating system identifier (ID), or the like.

In some embodiments, the predefined technique that is used in connection with generating the equipment code based at least in part on the terminal's characteristic parameters can include known techniques in the relevant technology. For example, so long as an equipment code used to uniquely identify the terminal can be generated based on certain characteristic parameters or characteristic fields of the terminal itself, any techniques can be used. For example, when the characteristic parameters including the brand of the terminal, the model number of the terminal, the terminal serial number, the IMEI, the IMSI, the MAC address, and the operating system ID are used by the technique to generate the equipment code, the technique can correspond to a hash function such that deviceId=Hash(C0+C1+C2+C3+C4+C5+C6), wherein deviceId represents the equipment code, C0 represents the brand, C1 represents the model number, C2 represents the IMEI, C3 represents the IMSI, C4 represents the MAC address (mac_address), C5 represents the terminal serial number (serial_num), and C6 represents the operating system ID. Various other techniques can be used to generate the equipment code. C0-C6 can be numerical values, strings, or in other appropriate formats as required by the Hash function. Hash( ) can be a cryptographic hash function such as SHA, MD5, etc.

At 220, a password is generated based at least in part on the equipment code and an output value from a counter. For example, the terminal generates a dynamic password based on the equipment code and the output value of a local counter. In some embodiments, the dynamic password is used by a server as the basis for verification of the terminal or user associated with the terminal. In some embodiments, the counter is a local counter that uses the frequency of a specified event transmitted locally as the input or the value of a specific parameter. In some embodiments, the frequency of a specified event can correspond to sending times of the access requests for one or more websites in a period. For example, the terminal time can be used as the input to the local counter. For example, the terminal time 2016-06-01-10:05:30 will result in a counter value of 20160601100530. In some embodiments, the counter is remote in relation to the terminal such that the terminal communicates the equipment code to the counter (e.g., a server hosting the counter or service associated with the counter value), and in response to the communication from the terminal, the counter returns the output value or the dynamic password.

In some embodiments, a seed key can be generated based at least in part on the equipment code (e.g., as the equipment code itself, as a hash value of the equipment code, etc.), and the dynamic password can be generated based at least in part on the seed key and the output value of the counter. For example, a symmetric key can be generated based on the equipment code, the session ID assigned to the terminal by a server associated with authentication of the terminal, and a user identifier (UID) assigned to the terminal (or the user associated with the terminal) by the server, in accordance with a key generation process (e.g., that the sender and the receiver use the same key to perform encryption and decryption operations on inputs that are formatted as plain text), and the terminal can generate the dynamic password based on the symmetric key and the output value, in accordance with a password generation process. In some embodiments, the session ID and/or the UID can be associated by the server. The session ID and/or the UID can be generated by random numbers to insure that the session ID and UID can be used for uniquely identifying the session and user respectively. In some embodiments, the session ID and/or the UID can be stored in a mapping of identifiers to user accounts. In some embodiments, the session ID and/or the UID can be dynamically generated (e.g., based on when the corresponding identifier is requested or needed).

In some embodiments, the first preset key generation process (e.g., to generate the symmetric key) can be expressed as: combining the equipment code, the session ID and the UID, or using a predefined technique in the relevant technology to perform encryption and generate the key. For example, techniques such as Data Encryption Standard (DES), Triple DES (e.g., 3DES) or Triple Data Encryption Algorithm (TDEA), International Data Encryption Algorithm (IDEA), etc. can be used.

According to various embodiments, the dynamic password can be generated using various methods. For example, there may be a variety of forms of expression for a password generation process. As one example, the dynamic password can be generated using the following technique: code=HMAC_SHA1(K,C), wherein code represents the dynamic password, HMAC_SHA1( ) is the hash function related to the key, HMAC represents the hash-based message authentication code related to the key, SHA1 (Secure Hash Algorithm 1) represents the secure hashing function, K represents the symmetric key, and C represents the output value. Other dynamic password generation processes can be used.

In some embodiments, HMAC_SHA1( ) can also be described as HMAC-SHA1( ) or HMAC(SHA1)( ); it is a key-controlled hash function being used as a hash-based message authentication code (HMAC). The HMAC process blends the key with message data, uses the hash function to perform hashing computations on the blended results, and then reapplies the hash function. HMAC_SHA1( ) receives a key of any size, and generates a hash series 160 digits in length. The message data can comprise, or otherwise correspond to, the output value. The implementation of HMAC_SHA1( ) is publically available (e.g., as library code).

At 230, the dynamic password is sent to the server. The server can use the dynamic password in connection with authentication of the terminal or the user associated therewith. The dynamic password can be sent to the server in connection with the communication of one or more other credentials (e.g., a user ID, or the like). In some embodiments, the terminal transmits the dynamic password to the server. The server can perform authentication of the terminal based at least in part on the dynamic password. A dynamic password can be generated by a server associated with the authentication process to determine whether to authenticate the terminal. For example, the server can execute the same operation as the terminal to generate a dynamic password, and compare the generated dynamic password against the received dynamic password transmitted from the terminal. The dynamic password can be generated based at least in part on a seed key and a counter that is local to the server. In some embodiments, the output value of the local counter can be communicated form the terminal to the server. In the event that the dynamic password that the server receives from the terminal matches the dynamic password generated by the server (in connection with the authentication of the terminal such as in response to a login or authentication request from the terminal), the terminal is determined to have passed authentication. Conversely, in the event that the dynamic password that the server receives from the terminal does not match the dynamic password generated by the server, the terminal is determined to have failed authentication.

Various embodiments do not require manual entry of the dynamic password. For example, the dynamic password can be invisible to the user throughout the authentication process. Because various embodiments do not require manual entry of the dynamic password, the problem of errors resulting from manual input can be avoided. Moreover, because characteristic parameters of the terminal can be used to generate the dynamic password, additional hardware equipment is therefore unnecessary, which reduces costs. In addition, various embodiments avoid the problem in software-realized dynamic passwords of verification failure resulting from the updating of the system time. Moreover, the terminal identifier (e.g., when the terminal is a mobile phone, the terminal identifier is the mobile phone number) can be used as the user ID, and the user does not need to memorize a password; the terminal's equipment code and the terminal identifier (e.g., if the terminal is a mobile phone, the terminal identifier is the mobile phone number) uniquely locate one device, and this does not change upon reinstallation and log-on of the client-end application. Moreover, during logged-on log analysis, mobile phone equipment can be located based on the current key at that time.

FIG. 3A is a flowchart of a method for authentication processing according to various embodiments of the present disclosure.

Referring to FIG. 3A, process 300 for authentication processing is provided. Process 300 can be implemented by, for example, device 100 of FIG. 1, system 900 of FIG. 9, system 1000 of FIG. 10, or computer system 1200 of FIG. 12.

At 305, a registration request is received. The registration request is sent to a server by the terminal. In some embodiments, the registration request comprises the verification code, equipment code, and a communication number. In some embodiments, the communication number can correspond to a phone number, a user identifier, account identifier, or the like. In some embodiments, the terminal can send the registration request to the server. For example, the communication number comprised in the registration request can be a communication number associated with the terminal. The communication number can be a number that is requested by the server (e.g., in connection with a login request). In some embodiments, the server can request the communication number (or otherwise obtain the communication number) before the registration request is received.

In the example of a mobile phone, the user logs on to the server using the mobile phone number, the server transmits a verification code via text message or Short Message Service (SMS) (e.g., equivalent to a verification request) to the mobile phone number, and the user uses the mobile phone to submit the verification code, equipment code, and mobile phone number to the server (e.g., collectively the registration request). In some embodiments, the equipment code can be generated based at least in part on the terminal's characteristic parameters in accordance with a predefined process. The equipment code can be displayed to the user on the mobile phone. In some embodiments, an application can be configured to obtain the verification code, equipment code, and mobile phone number (e.g., collectively the registration request) and submit the verification code, equipment code, and mobile phone number to the server in response to a user inputting an input corresponding to a submit command. In some embodiments, the verification code, equipment code, and mobile phone number can be submitted by the user at the user's initiative, or the user can submit the verification code, equipment code, and mobile phone number in response to a message received from the server.

At 310, it is determined whether the registration request is verified. For example, the server determines whether the verification code, equipment code, and the communication number communicated in the registration request are verified based at least in part on information stored in a verification database that stores a mapping of a verification code, an equipment code, and a communication number to a terminal or a user associated with the terminal.

In the event that the registration request is not verified, process 300 proceeds to 315 at which authentication fails. In some embodiments, when authentication is deemed to fail, login by the terminal can be rejected and/or an indication of failure of the authentication can be communicated by the server to the terminal.

In the event that the registration request is verified, process 300 proceeds to 320 at which a session ID and a UID are obtained. The session ID and/or the UID can be assigned by the server in connection with the authentication process. The terminal receives the session ID and UID assigned to the terminal by the server. In some embodiments, the terminal maintains the communication link with the server. The communication link can be expressed as a long connection or a short connection, but is not limited to these forms of expression. In some embodiments, a short connection corresponds to a connection by which a link between the sending side and the receiving side is to be disconnected after the data is sent and received between such sending side and receiving side. In some embodiments, the long connection corresponds to a connection by which the link between the sending side and the receiving side is maintained after the data is sent and received (e.g., the link is not disconnected upon the data being sent and received by such sending side any receiving side).

Using the example of a mobile phone, after server verification is passed, a session (expressed as a session ID) and UID are assigned to the terminal and saved locally; upon receipt of the session and the UID, the terminal also saves the session ID and the UID locally in order to facilitate subsequent use. The session ID and UID can be generated as random numbers.

At 325, an authentication request is communicated. For example, the server can send the authentication request to the terminal. For example, the server can communicate the authentication request to the terminal in response to a login request or otherwise in connection with the authentication process. The terminal can perform a verification of the authentication request. For example, the authentication request is verified based on a comparison of the parameter (e.g., user ID, session ID, or the like) carried in the authentication request and the parameter (e.g., user ID, session ID, or the like) stored in the server. In the event that the comparison result indicates the parameters are consistent, the authentication request is verified. The dynamic password can be generated in response to determining that the authentication request is verified.

Using the example of a mobile phone, when the user needs to log on to certain networks or systems, upon successful verification of the registration request, the server transmits an authentication request to the client on the mobile phone (e.g., the terminal receives the verification request transmitted by the server). In some embodiments, the authentication request is an HTTP response. In some embodiments, the authentication request is an HTTP request.

At 330, the dynamic password is communicated. For example, the server can receive the dynamic password from the terminal. The server can use the dynamic password in connection with the authentication of the terminal. In response to receiving the dynamic password from the terminal, the server can generate a dynamic password and compare the generated dynamic password to the dynamic password received from the server, and based on such comparison, determine whether the terminal is authenticated.

Figure 3B:
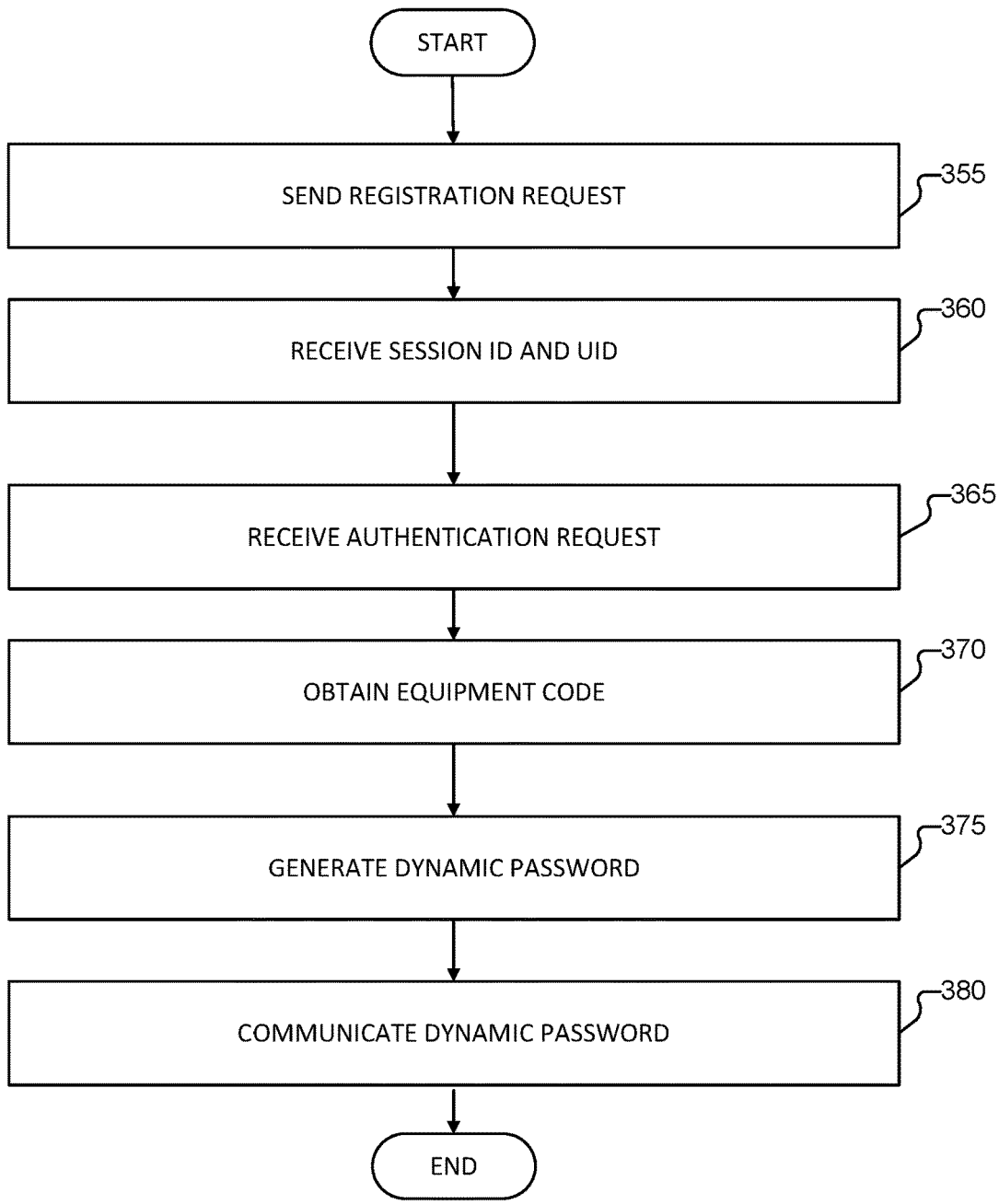
FIG. 3B is a flowchart of a method for authentication processing according to various embodiments of the present disclosure.

FIG. 3B is a flowchart of a method for authentication processing according to various embodiments of the present disclosure.

Referring to FIG. 3B, process 350 for authentication processing is provided. Process 350 can be implemented by, for example, device 400 of FIG. 4, device 500 of FIG. 5, system 900 of FIG. 9, system 1000 of FIG. 10, or computer system 1200 of FIG. 12. Process 350 can be performed in connection with process 300 of FIG. 3A.

At 355, a registration request is sent. For example, a terminal can send the registration request to a server (e.g., in connection with an authentication process). The registration request comprises the verification code, equipment code, and a communication number. The communication number can be a phone number, an account identifier, a user identifier, or the like. For example, the communication number comprised in the registration request can be a communication number associated with the terminal. The communication number can be a number that is requested by the server (e.g., in connection with a login request).

In the example of a mobile phone, the user logs on to the server using the mobile phone number, the server transmits a verification code via text message or Short Message Service (SMS) (e.g., equivalent to a verification request) to the mobile phone number, and the user uses the mobile phone to submit the verification code, equipment code, and mobile phone number to the server (e.g., collectively the registration request).

At 360, a session ID and a UID are received. The terminal can receive the session ID and the UID from a server. In response to receiving the session ID and the UID, the terminal can establish or maintain a connection with the server, or otherwise use the session ID and the UID in connection with communicating with the server. Upon receipt of the session ID and the UID, the terminal also saves the session ID and the UID locally in order to facilitate subsequent use. The session ID and UID can be generated as random numbers. In some embodiments, the terminal maintains the communication link with the server. The communication link can be expressed as a long connection or a short connection, but is not limited to these forms of expression.

At 365, an authentication request is received. The terminal can receive the authentication request from the server in connection with an authentication process. In response to receiving the authentication request, the terminal can perform a verification of the authentication request. For example, in some embodiments, the terminal can perform a verification of the authentication request and proceed to 370 in the event that the authentication request passes the verification.

At 370, an equipment code is obtained. The terminal can retrieve the equipment code in response to receiving the authentication request, or in response to verifying the authentication request. The equipment code can correspond to a number or other identifier that uniquely identifies the terminal associated therewith. The terminal can obtain the equipment code from storage (e.g., a local storage or a remote storage). In some embodiments, the terminal can derive the equipment code from information associated with, or otherwise corresponding to, the terminal. For example, the terminal can use a predefined process or technique to derive the equipment code.

At 375, a dynamic password is generated. The terminal can generate the dynamic password. For example, the terminal can generate the dynamic password based at least in part on the equipment code. For example, in response to receiving the authentication request, the terminal can generate the dynamic password. In some embodiments, the terminal generates the dynamic password in response to determining that the authentication request is verified. In some embodiments, the dynamic password is generated based at least in part on the aforesaid equipment code and the output value of a local counter. The dynamic password can be used as a basis for verification of the terminal by the server.

Using the example of a mobile phone, after the authentication request transmitted by the user (e.g., the terminal) to the server passes verification, the client on the mobile phone uses the equipment code, the session ID, and the UID to generate the symmetric key K in accordance with a predefined technique (e.g., addition), and uses the client time (i.e., the terminal time) as the output value C of the adding counter to generate the dynamic password.

At 380, the dynamic password is communicated. The terminal can send the dynamic password to the server. For example, the terminal can send the dynamic password to the server in connection with an authentication process. In some embodiments, the server can use the dynamic password in connection with authenticating the terminal (or user thereof). The terminal can send the dynamic password with other information. For example, the terminal can send the dynamic password to the server in conjunction with an output value (of a counter associated with the terminal).

In some embodiments, 370, 375, and/or 380 of process 350 of FIG. 3B can include 210, 220, and/or 230 of process 200 of FIG. 2.

Please note that all of the method embodiments described above have been presented as a series of combinations of actions in order to simplify the description. However, persons skilled in the art should know that the present invention is not limited by the action sequences that are described, for some of the steps may make use of another sequence or be implemented simultaneously in accordance with the present invention. Furthermore, persons skilled in the art should also know that the embodiments described herein are embodiments and that the actions and modules involved therein are not necessarily required by various other embodiments.

Figure 4:
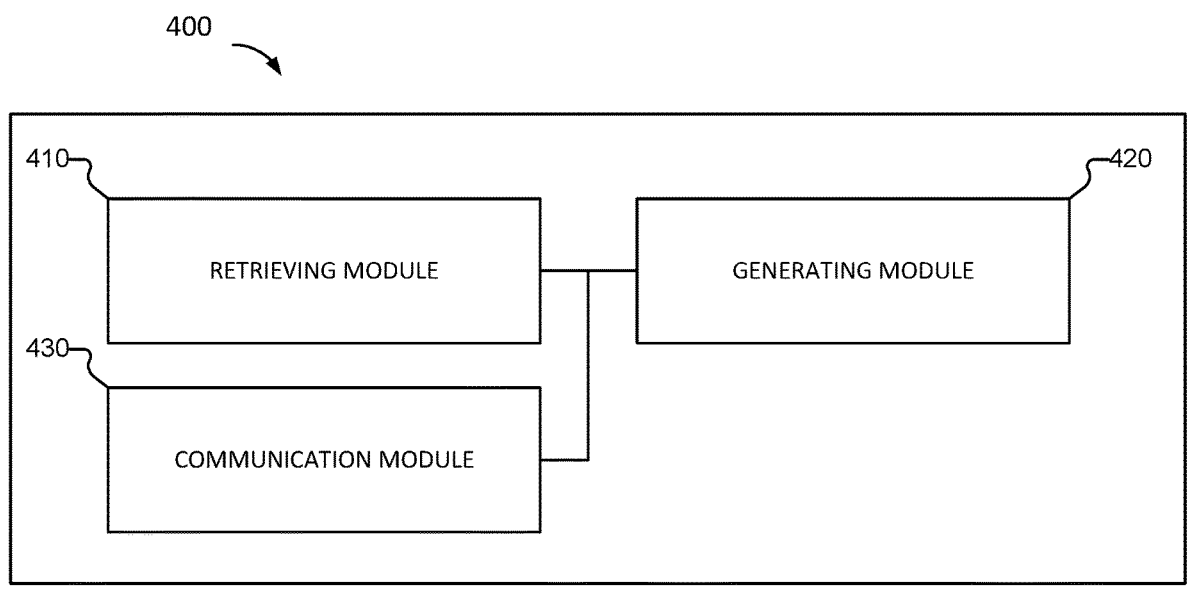
FIG. 4 is a block diagram of a device for authentication processing according to various embodiments of the present disclosure.

FIG. 4 is a block diagram of a device for authentication processing according to various embodiments of the present disclosure.

Figure 6:
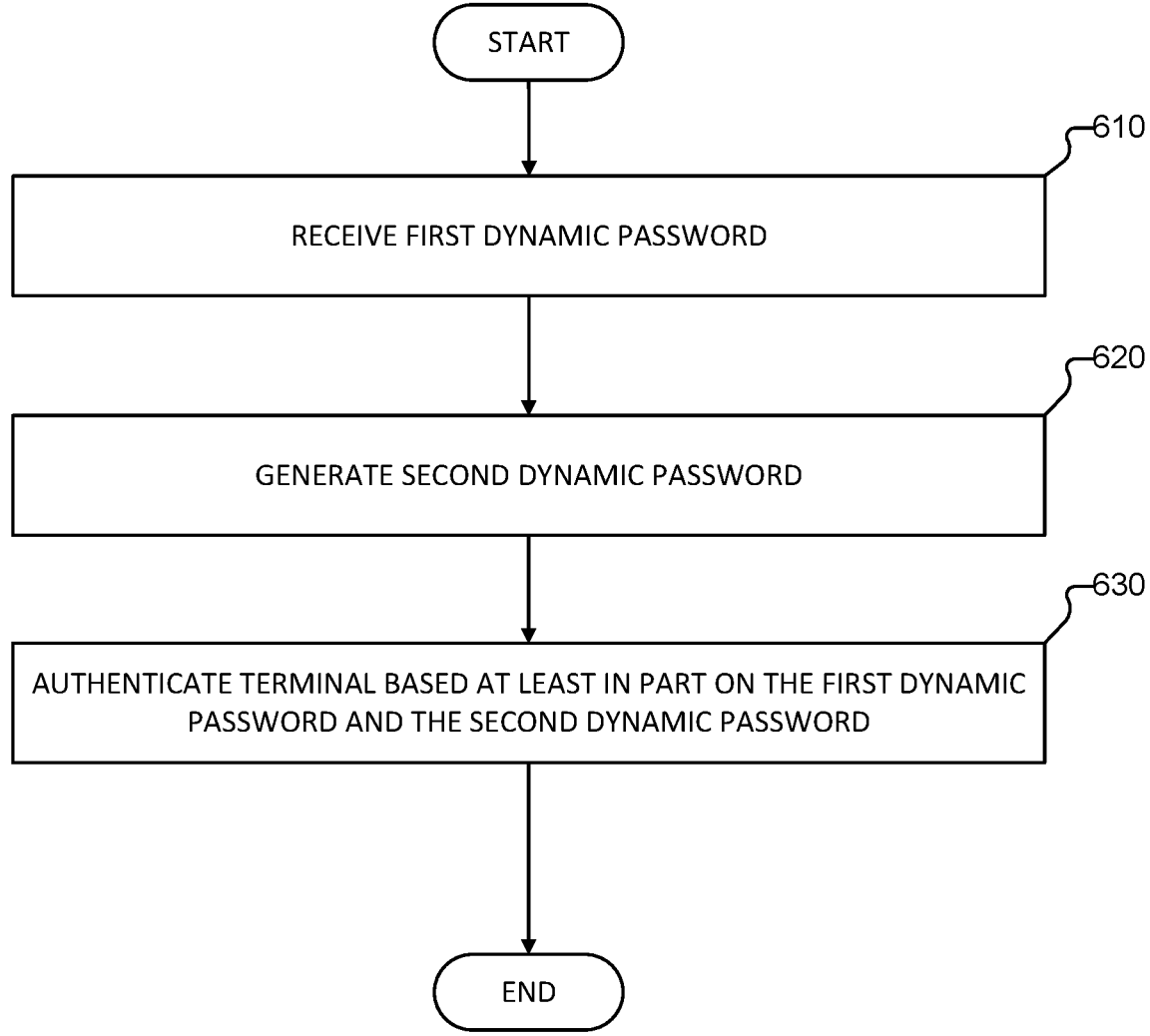
FIG. 6 is a flowchart of a method for authentication processing according to various embodiments of the present disclosure.

Referring to FIG. 4, device 400 can be implemented in connection with process 200 of FIG. 2, process 300 of FIG. 3A, process 350 of FIG. 3B, or process 600 of FIG. 6. Device 400 can be implemented in connection with system 1000 of FIG. 10, computer terminal 1100 of FIG. 11, or computer system 1200 of FIG. 12. Device 400 can be included in, or otherwise correspond to, a mobile terminal, a computer terminal, or similar operating device. In some embodiments, device 400 is implemented as a terminal. In some embodiments, device 400 is implemented as a server.

As illustrated in FIG. 4, device 400 can comprise a retrieving module 410, a generating module 420, and a communication interface 430.

In some embodiments, the retrieving module 410 is configured to retrieve an equipment code used to uniquely identify the terminal. The retrieving module 410 can obtain the equipment code from a storage. The storage from which the equipment code is obtained can be local or remote in relation to the terminal (e.g., device 400). In some embodiments, the equipment code is computed based at least in part on the terminal's characteristic parameters as described in connection with 110 of FIG. 1. The equipment code can be computed by the retrieving module 410 (e.g., after the retrieving module 410 retrieves the corresponding characteristic parameters), or the equipment code can be computed and stored in advance of the retrieving module 410 retrieving the equipment code.

According to various embodiments, the retrieving module 410 is configured to generate the equipment code. The retrieving module 410 can generate the equipment code based at least in part on the characteristic parameters of the terminal. The characteristic parameters comprise one or more of the following parameters: the brand of the terminal, the model number of the terminal, the terminal serial number, the IMEI, the IMSI, the MAC address, the operating system ID, and/or the like.

The generating module 420 can be configured to generate a dynamic password based on the equipment code and the output value of a local counter. In some embodiments, the dynamic password can be used by the server as a basis for verification of the terminal (e.g., device 400).

The communication interface 430 is configured to send the dynamic password to the server. The communication interface can be connected to the generating module 420. In some embodiments, the communication interface 430 is configured to communicate the dynamic password to the server via a communication link or channel (e.g., during a session).

Figure 5:
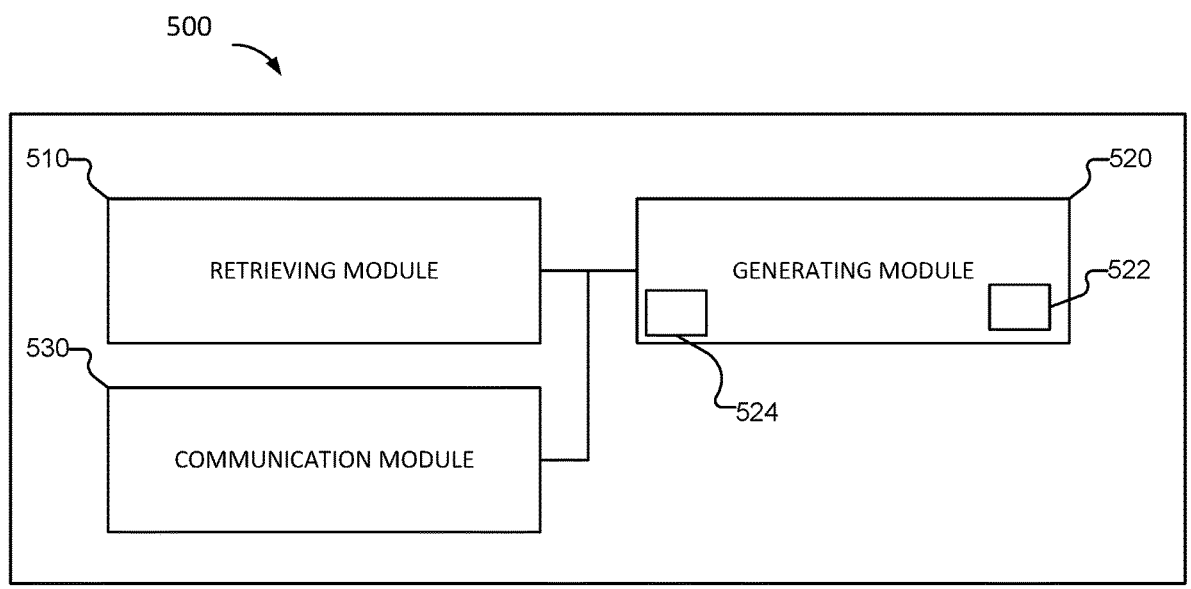
FIG. 5 is a block diagram of a device for authentication processing according to various embodiments of the present disclosure.

FIG. 5 is a block diagram of a device for authentication processing according to various embodiments of the present disclosure.

Referring to FIG. 5, device 500 can be implemented in connection with process 200 of FIG. 2, process 300 of FIG. 3A, process 350 of FIG. 3B, or process 600 of FIG. 6. Device 500 can be implemented in connection with system 1000 of FIG. 10, computer terminal 1100 of FIG. 11, or computer system 1200 of FIG. 12. Device 500 can be included in, or otherwise correspond to, a mobile terminal, a computer terminal, or similar operating device. In some embodiments, device 500 is implemented as a terminal. In some embodiments, device 500 is implemented as a server.

As illustrated in FIG. 5, device 500 can comprise a retrieving module 510, a generating module 520, and a communication module 530.

The retrieving module 510 is configured to retrieve an equipment code used to uniquely identify the terminal. The retrieving module 510 can correspond to retrieving module 410 of device 400 of FIG. 4.

The generating module 520 is configured to generate a dynamic password based on the equipment code and the output value of a local counter. As an example, the generating module 520 can correspond to generating module 420 of device 400 of FIG. 4. In addition, generating module 520 can include a first generating sub-module 522 and a second generating sub-module 524.

Generating module 520 can be configured to generate the dynamic password. First generating sub-module 522 is configured to generate a symmetric key based on the equipment code, the aforesaid session ID assigned to the aforesaid terminal by the server, and the UID assigned to the terminal by the server, in accordance with a preset identifier assignment process. Second generating sub-module 524 can be connected to the first generating sub-module 522 and be configured to generate the dynamic password based at least in part on the symmetric key and the output value, in accordance with a password generation process. In some embodiments, the preset identifier assignment process can be expressed as: combining the equipment code, the session ID, and the UID, or using a known technique in the relevant technology to perform encryption and generate the key. For example, techniques such as DES, 3DES (TDEA), IDEA, and so on can be used as the technique to perform encryption and to generate the key. Various other techniques can be used to generate the symmetric key. The dynamic password can be generated in a variety of methods (e.g., there may be a variety of forms of expression for the password generation process). For example, the dynamic password can be generated using the following function: Code=HMAC_SHA1 (K,C), wherein code represents the aforesaid dynamic password, HMAC_SHA1( ) is the hash function related to the key, HMAC represents the hash-based message authentication code related to the key, SHA1 represents the secure hash function, K represents the symmetric key, and C represents the output value.

According to various embodiments, the modules or sub-modules can be implemented in the form of software or hardware. In some embodiments, the retrieving module 510, the generating module 520, and the communication module 530 are located on the same processor. In some embodiments, the retrieving module 510, the generating module 520, and the communication module 530 are respectively located on different processors; or, any two of the retrieving module 510, the generating module 520, and the communication module 530 are located on the same processor, and the other module is located on another processor.

According to various embodiments, non-reliance on additional equipment and non-reliance on manual input and system times can be realized. For example, the dynamic password is generated based on the terminal's own characteristic parameters, thus resolving the technical issues present in the conventional technology of requiring additional equipment, which typically results in higher costs. As another example, the dynamic password generated based on the terminal's own characteristic parameters resolves the technical issues associated with requiring manual input of the dynamic password, which otherwise results in greater likelihood of input errors or software system time updates, which make verification failure more likely.

FIG. 6 is a flowchart of a method for authentication processing according to various embodiments of the present disclosure.

Referring to FIG. 6, process 600 for authentication processing is provided. Process 600 can be implemented by, for example, device 700 of FIG. 7, device 800 of FIG. 8, system 900 of FIG. 9, system 1000 of FIG. 10, or computer system 1200 of FIG. 12.

According to various embodiments, an authentication process can be run on a server. As an example, the structure of the server can be implemented using the structure of device 100 of FIG. 1.

At 610, a first dynamic password is received. The server can receive the first dynamic password transmitted by a terminal. The first dynamic password can correspond to a dynamic password generated by the terminal. The terminal can generate the first dynamic password based on the output value of a local counter (e.g., a counter in the terminal) and an equipment code used to uniquely identify the terminal. The server can receive other information associated with the authentication process. For example, the server can receive the output value communicated by the terminal along with the first dynamic password.

Various methods can be used to generate the equipment code. In some embodiments, the terminal generates the aforesaid equipment code based at least in part on one or more of the characteristic parameters of the terminal using a predefined technique. The one or more characteristic parameters can comprise one or more of the following parameters: the brand of the terminal, the model number of the terminal, the terminal serial number, the IMEI, the IMSI, the MAC address, the operation system ID, and the like.

At 620, a second dynamic password is generated. In some embodiments, the server generates the second dynamic password. The server can generate the second dynamic password based at least in part on an equipment code retrieved in advance. For example, the server can retrieve an equipment code associated with the terminal from a storage (e.g., a database) storing a mapping of equipment codes to terminals or to users. The server can use other information in connection with generating the second dynamic password, such as other information obtained from the terminal or from the storage that stores mappings of information to terminals. For example, the server can receive an output value from the terminal, and use such output value in the generation of the second dynamic password. The server can compare the first dynamic password with the second dynamic password to authenticate the terminal. For example, the server can determine whether the first dynamic password and the second dynamic password match. In some embodiments, the terminal or the server generates a symmetric key based on the equipment code, the session ID assigned to the terminal by the server, and the UID assigned to the terminal by the server, in accordance with a preset identifier assignment process; and the terminal or server generates the first dynamic password or the second dynamic password based on the symmetric key and the output value.

In some embodiments, before step 620, the server can retrieve an equipment code in advance and save the equipment code, in order to prepare in advance for the subsequent authentication process. For example, before the server generates the second dynamic password based on the equipment code retrieved in advance, the server can transmit a verification request to the aforesaid terminal; and the server receives a verification code and the aforesaid equipment code transmitted by the aforesaid terminal based at least in part on (e.g., in response to) the verification request.

At 630, the terminal is authenticated based at least in part on the first dynamic password and the second dynamic password. In some embodiments, the server performs authentication of the aforesaid terminal based on results of the comparison of the first dynamic password and the second dynamic password. In the event that the results of the comparison indicate that the first dynamic password and the second dynamic password match, the terminal is determined to have passed authentication. Conversely, in the event that the results of the comparison indicate that the first dynamic password and the second dynamic password do not match, the terminal is determined to have failed authentication. After the terminal is authenticated, the user can proceed to use the terminal to access services provided by the server.

The first dynamic password and the second dynamic password can be generated using the same method. For example, the first dynamic password and the second dynamic password can be generated using the following method: the terminal or the server generates a symmetric key based on the aforesaid equipment code, the session ID assigned to the terminal by the server, and the UID assigned to the terminal by the server, in accordance with a preset identifier assignment process; and the terminal or server generates the aforesaid first dynamic password or the aforesaid second dynamic password based on the aforesaid symmetric key and the output value.

Figure 7:
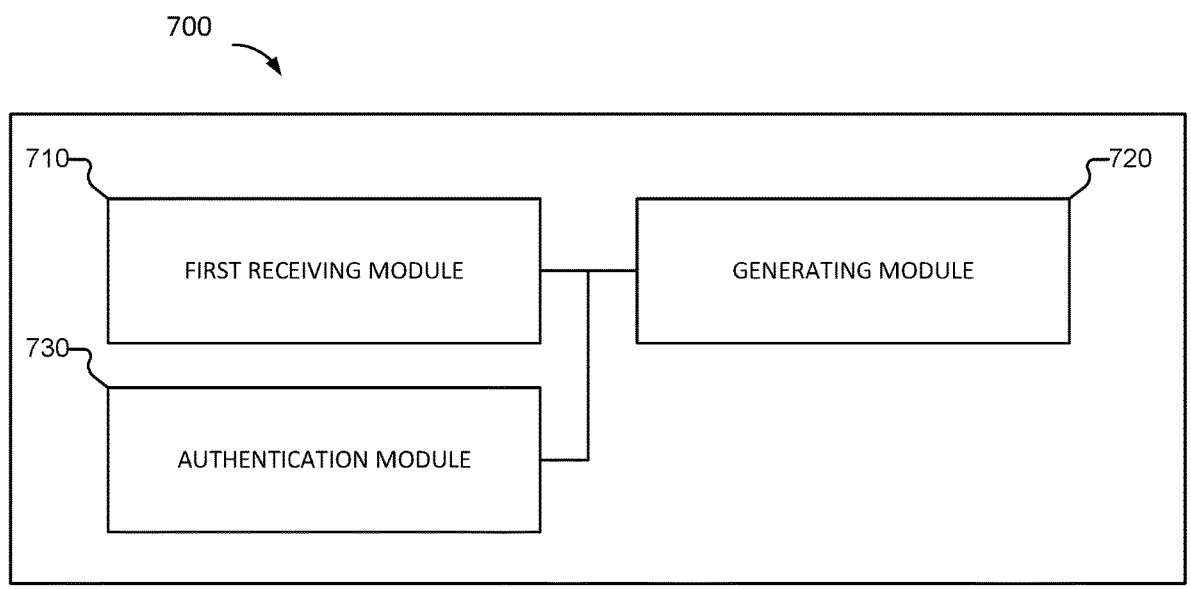
FIG. 7 is a block diagram of a device for authentication processing according to various embodiments of the present disclosure.

FIG. 7 is a block diagram of a device for authentication processing according to various embodiments of the present disclosure.

Referring to FIG. 7, device 700 can be implemented in connection with process 200 of FIG. 2, process 300 of FIG. 3A, process 350 of FIG. 3B, or process 600 of FIG. 6. Device 700 can be implemented in connection with system 1000 of FIG. 10, computer terminal 1100 of FIG. 11, or computer system 1200 of FIG. 12. Device 700 can be included in, or otherwise correspond to, a computer terminal, a server, or similar operating device.

As illustrated in FIG. 7, device 700 can comprise a first receiving module 710, a generating module 720, and an authentication module 730.

The first receiving module 710 can be configured to receive a first dynamic password transmitted by the terminal. The first dynamic password is a dynamic password generated by the terminal based on the output value of a local counter and an equipment code used to uniquely identify the terminal. The first receiving module 710 can receive the first dynamic password from the terminal over a network such as the Internet, or the like. The first receiving module 710 can implement 610 of process 600 of FIG. 6.

The generating module 720 can be connected to the first receiving module 710. The generating module 720 can be configured to generate a second dynamic password based at least in part on an equipment code associated with the terminal. The equipment code associated with the terminal is retrieved in advance. The generating module 720 can be further configured to compare the first dynamic password against the second dynamic password in connection with determining whether the first dynamic password and the second dynamic password match. The generating module 720 can implement 620 of process 600 of FIG. 6.

The authentication module 730 can be connected to the generating module 720. The authentication module 730 can be configured to perform authentication of the terminal based at least in part on the first dynamic password and the second dynamic password. For example, the authentication module can use results of the comparison of the first dynamic password and the second dynamic password to determine whether the terminal is authenticated. In the event that the results of the comparison indicate that the first dynamic password and the second dynamic password match, the terminal is determined to have passed authentication. Conversely, in the event that the results of the comparison indicate that the first dynamic password and the second dynamic password do not match, the terminal is determined to have failed authentication. The authentication module 730 can implement 630 of process 600 of FIG. 6.

Figure 8:
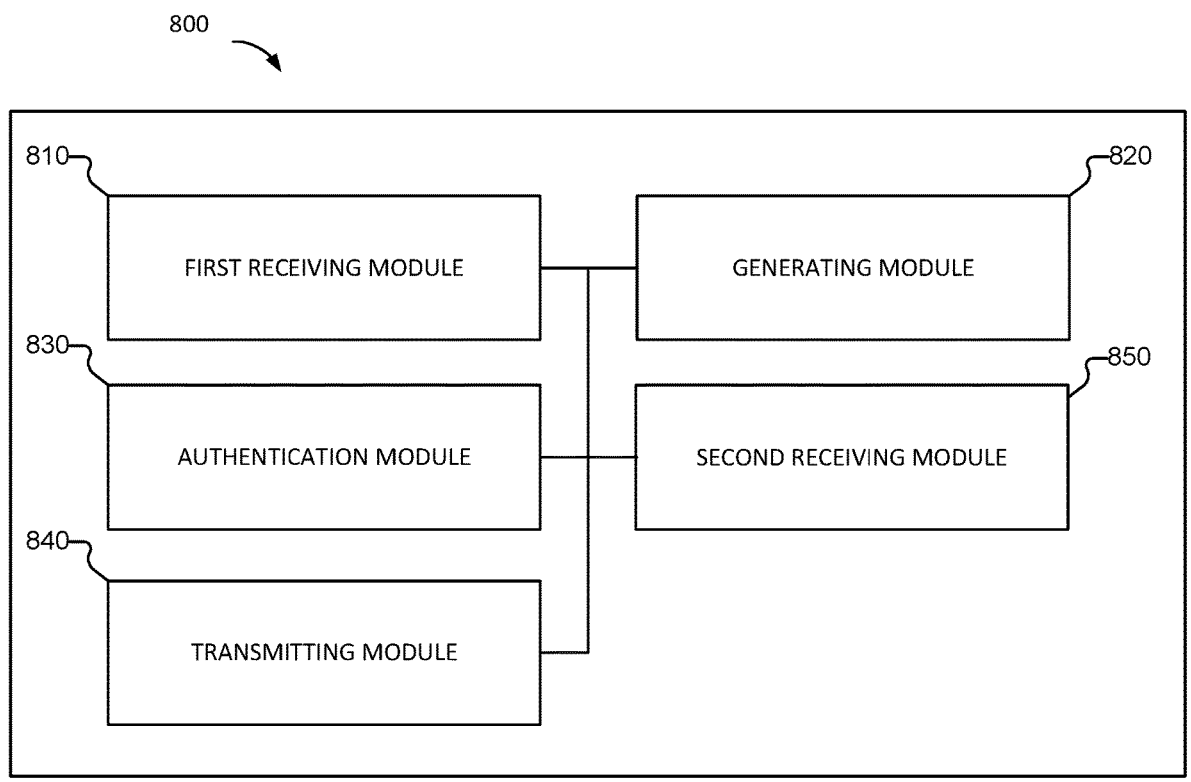
FIG. 8 is a block diagram of a device for authentication processing according to various embodiments of the present disclosure.

FIG. 8 is a block diagram of a device for authentication processing according to various embodiments of the present disclosure.

Referring to FIG. 8, device 800 can be implemented in connection with process 200 of FIG. 2, process 300 of FIG. 3A, process 350 of FIG. 3B, or process 600 of FIG. 6. Device 800 can be implemented in connection with system 1000 of FIG. 10, computer terminal 1100 of FIG. 11, or computer system 1200 of FIG. 12. Device 800 can be included in, or otherwise correspond to, a computer terminal, a server, or similar operating device.

As illustrated in FIG. 8, device 800 can comprise a first receiving module 810, a generating module 820, an authentication module 830, a transmitting module 840, and a second receiving module 850.

In some embodiments, first receiving module 810 can be implemented by first receiving module 710 of device 700 of FIG. 7.

In some embodiments, generating module 820 can be implemented by generating module 720 of device 700 of FIG. 7.

In some embodiments, authentication module 830 can be implemented by authentication module 730 of device 700 of FIG. 7.

The transmitting module 840 can be configured to transmit a verification request to the aforesaid terminal. The transmitting module can transmit the verification request before generation of a second dynamic password based on an equipment code retrieved in advance.

The second receiving module 850 can be connected to the transmitting module 840. The second receiving module 850 can be configured to receive the verification code and the equipment code transmitted by the terminal based at least in part on (e.g., in response to) the verification request.

In some embodiments, the equipment code can be determined based at least in part by: the terminal generating an equipment code based on one or more of the characteristic parameters of the terminal, in accordance with a predefined technique. The characteristic parameters can comprise one or more of the following parameters: the brand of the terminal, the model number of the terminal, the terminal serial number, the IMEI, the IMSI, the MAC address, the operating system ID, and the like. In some embodiments, the predefined technique corresponds to, or otherwise includes, a hash function.

The generating module 820 can be configured to generate the second dynamic password by generating a symmetric key based at least in part on the aforesaid equipment code, the session ID assigned to the terminal by the server, and the UID assigned to the terminal by the server, in accordance with a preset identifier assignment process; and generating the second dynamic password based at least in part on the symmetric key and the output value in accordance with a password generation process. The first preset identifier assignment process can comprise, but is not limited to, the following: combining the equipment code, the session ID, and the UID. The password generation process can comprise, but is not limited to: generation of the second dynamic password in accordance with the following function: Code=HMAC_SHA1(K,C), wherein code represents the second dynamic password, HMAC_SHA1( ) is the hash function related to the key, HMAC represents the hash-based message authentication code related to the key, the aforesaid SHA1 represents the secure hash function, K represents the symmetric key, and C represents the output value.

Figure 9:
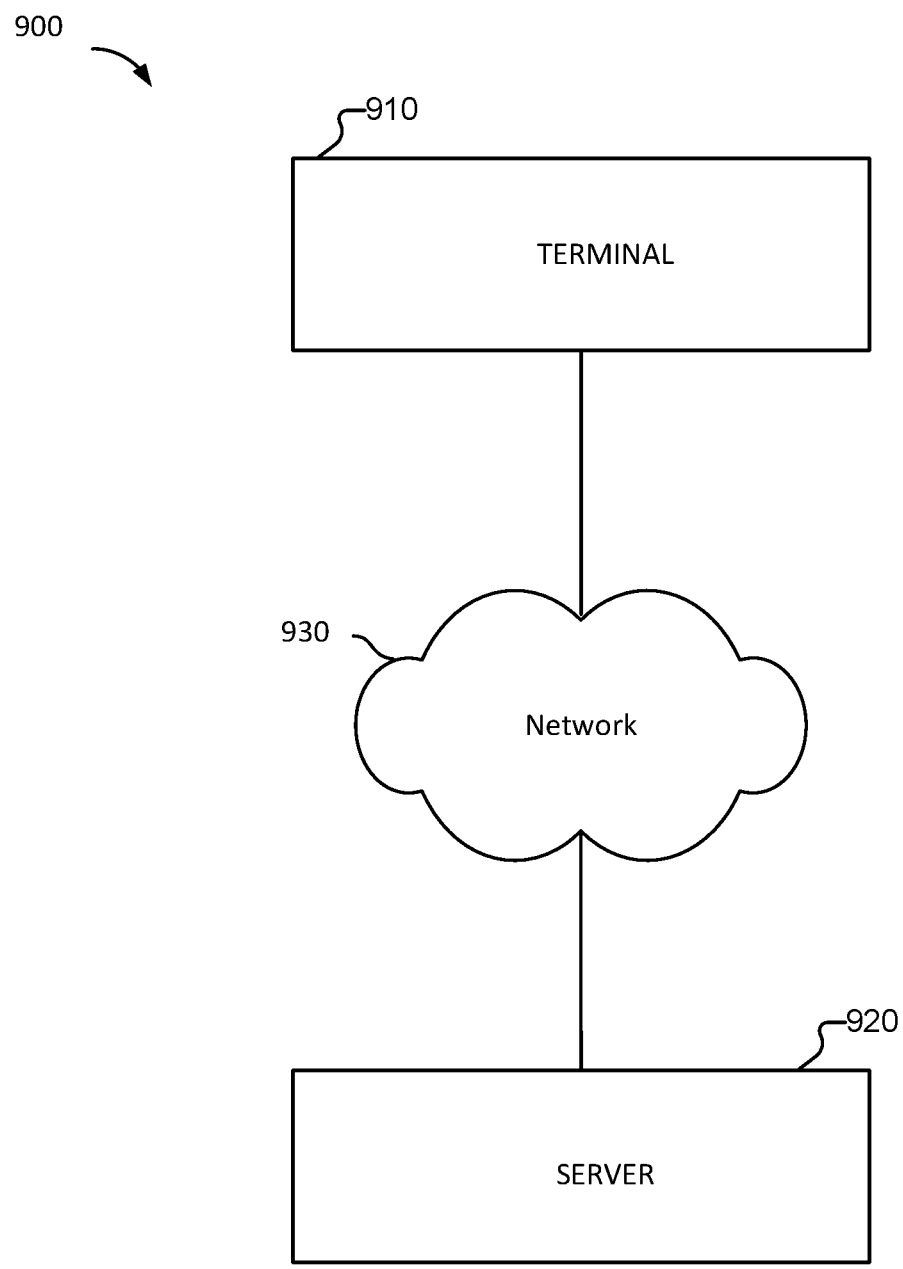
FIG. 9 is a structural schematic diagram of a system for authentication processing according to various embodiments of the present disclosure.

FIG. 9 is a structural schematic diagram of a system for authentication processing according to various embodiments of the present disclosure.

Referring to FIG. 9, system 900 can be implemented in connection with process 200 of FIG. 2, process 300 of FIG. 3A, process 350 of FIG. 3B, or process 600 of FIG. 6. System 900 can implement device 100 of FIG. 1, device 500 of FIG. 5, and/or device 700 of FIG. 7. System 900 can be implemented in connection with system 1000 of FIG. 10, computer terminal 1100 of FIG. 11, or computer system 1200 of FIG. 12.

As illustrated in FIG. 9, system 900 can comprise a terminal 910 and a server 920. System 900 can further comprise a network 930 over which terminal 910 and server 920 communicate.

Terminal 910 can generate a dynamic password used by the server 920 in connection with server 920 authenticating the terminal 910. For example, server 920 can compare the dynamic password that server 920 receives from terminal 910 with a dynamic password generated by server 920. Server 920 can authenticate terminal 910 based at least in part on the comparison of the dynamic password generated by terminal 910 (e.g., the first dynamic password) with the dynamic password generated by server 920 (e.g., the second dynamic password).

Terminal 910 can comprise device 100 of FIG. 1. Server 920 can comprise device 400 of FIG. 4.

Figure 10:
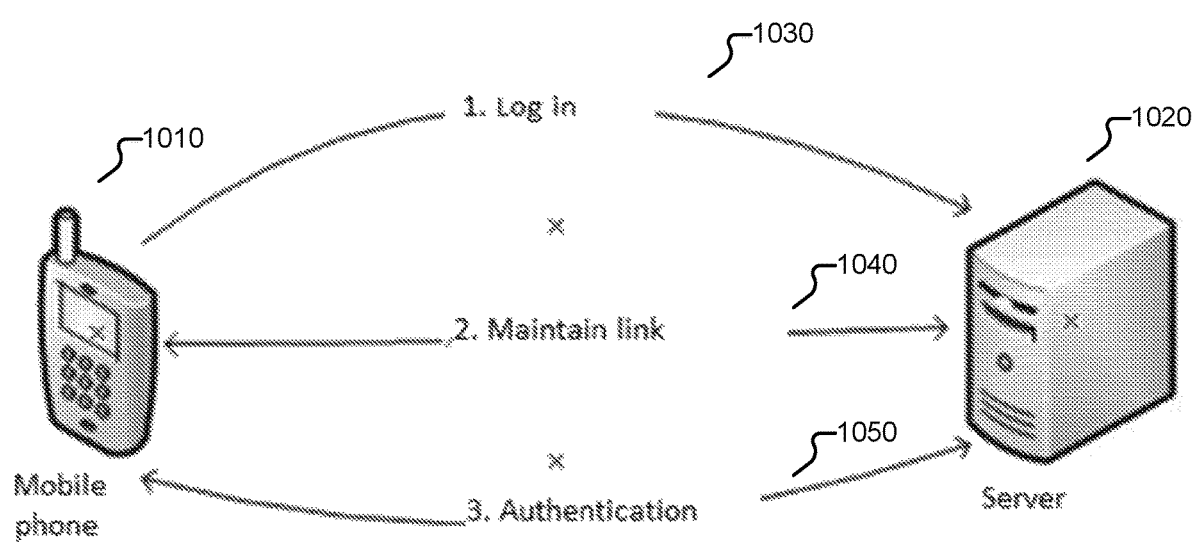
FIG. 10 is a structural schematic diagram of a system for authentication processing according to various embodiments of the present disclosure.

FIG. 10 is a structural schematic diagram of a system for authentication processing according to various embodiments of the present disclosure.

Referring to FIG. 10, system 1000 can be implemented in connection with process 200 of FIG. 2, process 300 of FIG. 3A, process 350 of FIG. 3B, or process 600 of FIG. 6. System 1000 can implement device 100 of FIG. 1, device 500 of FIG. 5, and/or device 700 of FIG. 7. System 1000 can be implemented in connection with system 900 of FIG. 9, computer terminal 1100 of FIG. 11, or computer system 1200 of FIG. 12.

As illustrated in FIG. 10, system 1000 can comprise a terminal 1010 (e.g., a mobile phone) and a server 1020. Terminal 1010 and server 1020 can communicate with each other in connection with authentication of terminal 1010 by server 1020.

At 1030, a user logs on to server 1020 using the mobile phone number of terminal 1010. Server 1020 transmits a verification message (e.g., SMS message, text message, etc.) to the mobile phone number associated with terminal 1010, and the user submits the verification code, the device ID, and the mobile phone number to server 1020 via the mobile phone 1010. In some embodiments, the user can submit the verification code, the device ID, and the mobile phone number via an interface provided by terminal 1010. In some embodiments, the verification code, the device ID, and the mobile phone number can be stored on a device, and the user can select to submit the verification code, the device ID, and the mobile phone number to server 1020 by selecting a submit/send button provided on an interface displayed to the user on terminal 1010. The interface displayed to the user can be displayed in connection with a standalone software application, a browser-based application, or the like. For example, a standalone software application can be installed and executed by the terminal in connection with an authentication process. As another example, the authentication process can use a browser-based application to display the interface to the user. Server 1020 can perform verification of the verification code, the device ID, and the mobile phone number. In response to determining that the verification code, the device ID, and the mobile phone number pass verification, server 1020 saves and assigns a session ID and a UID, and saves the session ID and the UID for subsequent use. Server 1020 sends the session ID and the UID to terminal 1010, which stores the session ID and the UID for subsequent use.

At 1040, terminal 1010 and server 1020 maintain a communication session with each other (e.g., an HTTP session).

At 1050, when the user logs on to certain systems or networks, server 1020 transmits an authentication request to terminal 1010 (e.g., to a client on the mobile phone). The user (or the terminal) verifies the authentication request. The client on terminal 1010 combines the device ID, the session ID, and the UID to form the symmetric key K, uses the client time as the adding counter C, and generates the dynamic password code. The client on terminal 1010 transmits the dynamic password to server 1020, server 1020 performs the same operation of generating a dynamic password code, server 1020 compares the dynamic passwords, and the authentication operation is then completed based on results of the comparison of the dynamic passwords (e.g., the dynamic password communicated by terminal 1010 to server 1020, and the dynamic password generated on server-side).

In some embodiments, the terminal can be a computer terminal and can be located on at least one piece of network equipment among multiple pieces of network equipment in a computer network.

The computer terminal can execute the program code for the steps in a terminal authentication processing method. For example, the computer terminal can execute program code associated with the terminal retrieving the equipment code used to uniquely identify the terminal, the terminal generating a dynamic password based on the equipment code and the output value of a local counter, wherein, the dynamic password is a basis for verification of the terminal by a server, and the terminal transmitting the dynamic password to the server.

Figure 11:
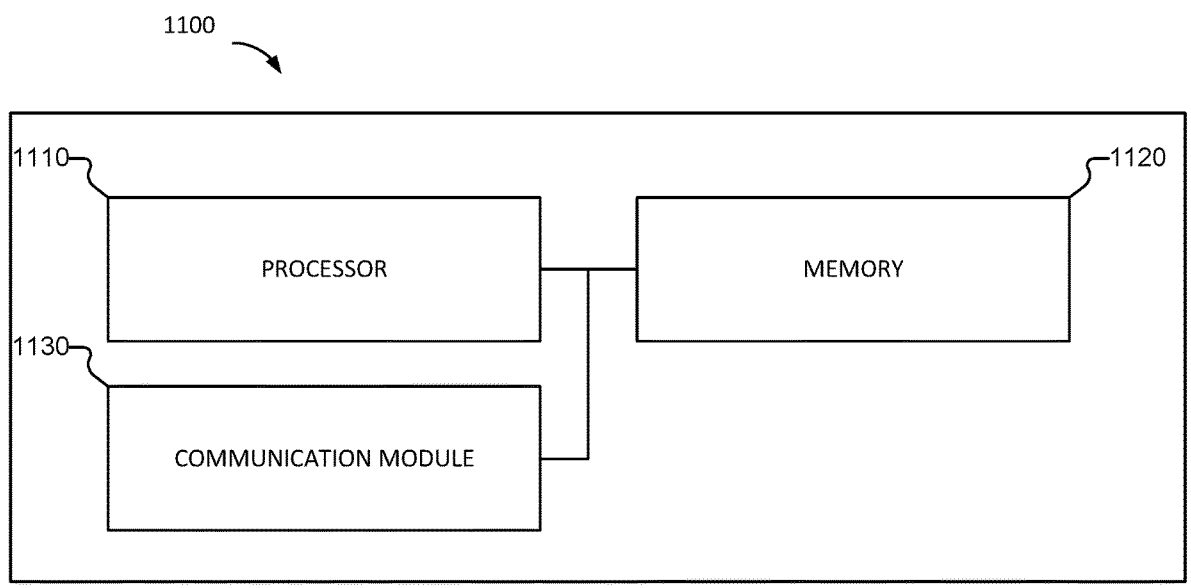
FIG. 11 is a block diagram of a computer terminal for authentication processing according to various embodiments of the present disclosure.

FIG. 11 is a block diagram of a computer terminal for authentication processing according to various embodiments of the present disclosure.

Referring to FIG. 11, computer terminal 1100 can be implemented in connection with process 200 of FIG. 2, process 300 of FIG. 3A, process 350 of FIG. 3B, or process 600 of FIG. 6. Computer terminal 1100 can implement device 100 of FIG. 1, device 500 of FIG. 5, and/or device 700 of FIG. 7. Computer terminal 1100 can be implemented in connection with system 900 of FIG. 9, system 1000 of FIG. 10, or computer system 1200 of FIG. 12.

As illustrated in FIG. 11, computer terminal 1100 can comprise one or more processors 1110, a memory 1120, and a communication interface 1130.

Memory 1120 can be used to store software programs and modules, such as the program commands/modules corresponding to the terminal authentication processing method or device according to various embodiments. By running the software programs and modules stored in the memory 1120, processor 1110 thereby executes the various functional applications and data processing, thus achieving a method of vulnerability detection of the aforesaid system. Memory 1120 can comprise high-speed random memory, and may also comprise non-volatile memory, such as one or more magnetic storage devices, or other non-volatile solid state memory devices. In some embodiments, memory 1120 can further comprise memory devices disposed remotely relative to the processor 1110; such remote memory devices can connect to computer terminal 1100 via a network. Examples of the aforesaid network comprise but are not limited to the Internet, corporate intranets, local area networks, wide area networks, mobile communication networks, and combinations thereof.

The communication interface 1130 can be used to receive or transmit data via a network. Specific examples of the aforesaid network may include cable networks and wireless networks. In one example, communication interface 1130 comprises a network interface controller (NIC), which can be connected to a router via cable and other network equipment, and can thereby communicate with the Internet or a local area network. In one example, communication interface 1130 is a radio frequency (RF) module, which is used to communicate wirelessly with the Internet.

In some embodiments, memory 1120 is used to store preset action conditions and preset authorized user information, as well as application programs.

Processor 1110 can invoke information and application programs stored in memory 1120 in order to execute the following steps: computer terminal 1100 retrieves an equipment code used to uniquely identify the computer terminal 1100; computer terminal 1100 generates a dynamic password based on the equipment code and the output value of a local counter, wherein, the dynamic password is a basis for verification of computer terminal 1100 by a server; computer terminal 1100 transmits the aforesaid dynamic password to the server.

In some embodiments, processor 1110 can execute the program code for the following steps: computer terminal 1100 generates an equipment code based on the characteristic parameters of computer terminal 1100 in accordance with a preset technique, wherein, the characteristic parameters comprise one or more of the following parameters: the brand of the computer terminal 1100, the model number of the computer terminal 1100, the terminal serial number, the IMEI, the IMS, the MAC address, the operating system ID, and the like.

In some embodiments, processor 1110 can execute the program code for the following steps: computer terminal 1100 generates a symmetric key based on the aforesaid equipment code, the session ID assigned to computer terminal 1100 by the server, and the UID assigned to computer terminal 1100 by the server, in accordance with a first preset identifier assignment process; computer terminal 1100 generates the dynamic password based on the symmetric key and the output value in accordance with a second preset password generation process.

In some embodiments, processor 1110 can execute the program code for the following steps: computer terminal 1100 transmits a registration request to the server, wherein, the registration request contains the verification code, the equipment code, and the communication number of the terminal requested from computer terminal 1100 by the server; after the registration request passes verification, computer terminal 1100 receives the aforesaid session ID and the aforesaid UID assigned to computer terminal 1100 by the server, and maintains the communication link with the server.

In some embodiments, processor 1110 can execute the program code for the following steps: computer terminal 1100 receives an authentication request from the server, wherein, when the authentication request passes verification, computer terminal 1100 is caused to generate the aforesaid dynamic password.

Using the aforesaid technical scheme provided in various embodiments resolves the following technical problems of conventional art: higher costs resulting from the need for additional hardware equipment; input errors resulting from the need for manual input; and verification failures resulting from software version system updates.

The structures shown in FIG. 11 are merely exemplary. Computer terminal 1100 can also be a smart phone (such as an Android phone, an iOS phone, etc.), a tablet, a handheld computer, or a mobile Internet device (MID), PAD, or other terminal equipment. FIG. 11 does not constitute a limitation of the structure of the aforesaid electronic device. For example, computer terminal 1100 can also include more or fewer components than are shown in FIG. 11 (such as network interfaces, display devices, etc.), or may have a different configuration than that shown in FIG. 11.

Persons with ordinary skill in the art may understand that all or part of the steps of the various methods in the aforesaid embodiments can be accomplished using programs that command the hardware relevant to the terminal equipment, such programs may be stored on one computer-readable storage medium, and the storage medium may comprise: Flash drive, read-only memory (ROM), random access memory (RAM), magnetic disk, or optical disk.

Various embodiments include a storage medium. The storage medium can be used to save the program code executed by the terminal authentication processing method of process 200 of FIG. 2 or device 100 of FIG. 1.

In some embodiments, the storage medium is located in any computer terminal in a computer terminal group in a computer network or located in any mobile terminal in a mobile terminal group.

In some embodiments, the storage medium is configured to store the program code used to execute the following steps: the terminal generates a dynamic password based on the equipment code and the output value of a local counter, wherein, the dynamic password is the basis for verification of the terminal by the server; and the terminal transmits the dynamic password to the server. The storage medium can also be configured to store the program code used to execute elements of process 200 of FIG. 2.

It should be noted here that any of the computers in the aforesaid computer terminal group can establish a communication relationship with the network server and scanner, and the scanner can scan the value commands of the web applications executed by the php or script on the computer terminal.

According to various embodiments, a computer terminal can be provided, wherein such computer terminal implements process 600 of FIG. 6.

According to various embodiments, the computer terminal can be located on at least one piece of network equipment among multiple pieces of network equipment in a computer network.

In some embodiments, the computer terminal can execute the program code for the following steps in the terminal authentication method: the server receives a first dynamic password transmitted by the terminal, wherein, the first dynamic password is a dynamic password generated based on the output value and the equipment code used to uniquely identify the terminal; the server generates a second dynamic password based on an equipment code retrieved in advance, and compares the first dynamic password against the second dynamic password to determine whether the first dynamic password and the second dynamic password match; the server performs authentication of the terminal based on the comparison results, wherein, if the comparison results indicate a match, the terminal is determined to have passed authentication; otherwise, the terminal is determined to have failed authentication.

Processor 1110 can use communication interface 1130 to invoke the information and applications stored on the memory 1120 in order to execute the following steps: the server receives the first dynamic password transmitted by the aforesaid terminal, wherein, the first dynamic password is a dynamic password generated by the terminal based on the aforesaid output value and the equipment code used to uniquely identify the terminal; the server generates a second dynamic password based on an equipment code retrieved in advance, and compares the first dynamic password against the second dynamic password to determine whether the first dynamic password and the second dynamic password match; the server performs authentication of the terminal based on the comparison results, wherein, when the comparison results indicate a match, the terminal is determined to have passed authentication; otherwise, the terminal is determined to have failed authentication.

In some embodiments, processor 1110 can also execute the program code for the following steps: the server transmits a verification request to the terminal; the server receives the verification code and the equipment code transmitted by the terminal based on the verification request.

According to various embodiments, a storage medium can be provided, wherein the storage medium is used to save the program code executed by process 600 of FIG. 6.

The storage medium may be located in any computer terminal in a computer terminal group in a computer network or located in any mobile terminal in a mobile terminal group.

In some embodiments, the storage medium is set to store the program code used to execute the following steps: the server receives a first dynamic password transmitted by the terminal, wherein, the first dynamic password is a dynamic password generated by the terminal based on the output value and the equipment code used to uniquely identify the terminal; the server generates a second dynamic password based on an equipment code retrieved in advance, and compares the first dynamic password against the second dynamic password to determine whether the first dynamic password and the second dynamic password match; the server performs authentication of the terminal based on the comparison results, wherein, if the comparison results indicate a match, the terminal is determined to have passed authentication; otherwise, the terminal is determined to have failed authentication. The storage medium can also be configured to store the steps used to execute process 600 of FIG. 6.

Figure 12:
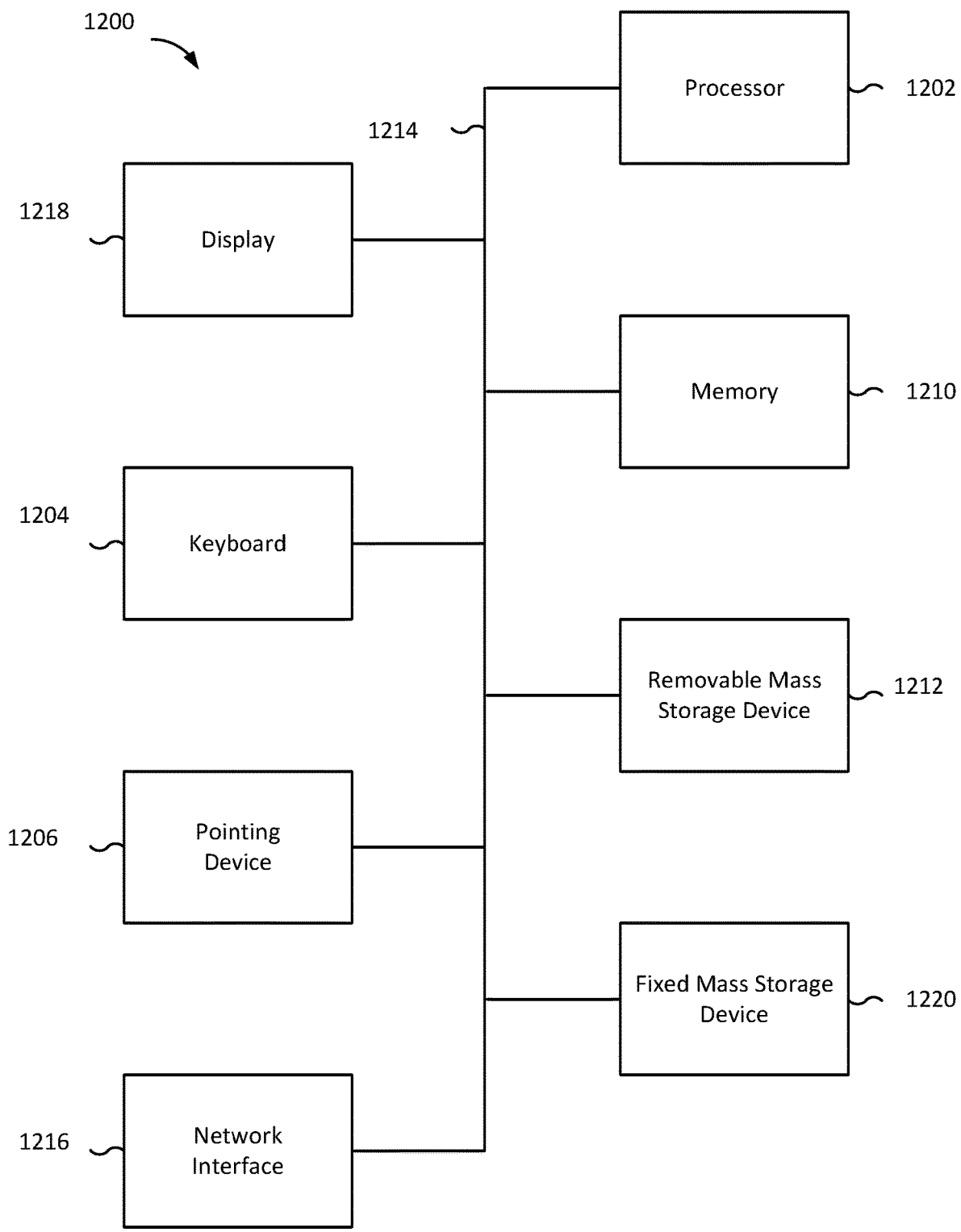
FIG. 12 is a functional diagram of a computer system for authentication processing according to various embodiments of the present disclosure.

FIG. 12 is a functional diagram of a computer system for authentication processing according to various embodiments of the present disclosure.

Referring to FIG. 12, a computer system 1200 for authentication processing is displayed. Computer system 1200 can implement process 200 of FIG. 2, process 300 of FIG. 3A, process 350 of FIG. 3B, or process 600 of FIG. 6. Computer system 1200 can implement device 100 of FIG. 1, device 400 of FIG. 4, device 500 of FIG. 5, device 700 of FIG. 7, or device 800 of FIG. 8. As will be apparent, other computer system architectures and configurations can be used to implement a display interface. Computer system 1200, which includes various subsystems as described below, includes at least one microprocessor subsystem (also referred to as a processor or a central processing unit (CPU)) 1202. For example, processor 1202 can be implemented by a single-chip processor or by multiple processors. In some embodiments, processor 1202 is a general purpose digital processor that controls the operation of the computer system 1200. Using instructions retrieved from memory 1210, the processor 1202 controls the reception and manipulation of input data, and the output and display of data on output devices (e.g., display 1218).

Processor 1202 is coupled bi-directionally with memory 1210, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 1202. Also as is well known in the art, primary storage typically includes basic operating instructions, program code, data, and objects used by the processor 1202 to perform its functions (e.g., programmed instructions). For example, memory 1210 can include any suitable computer-readable storage media, described below, depending on whether, for example, data access needs to be bi-directional or uni-directional. For example, processor 1202 can also directly and very rapidly retrieve and store frequently needed data in a cache memory (not shown). The memory can be a non-transitory computer-readable storage medium.

A removable mass storage device 1212 provides additional data storage capacity for the computer system 1200, and is coupled either bi-directionally (read/write) or uni-directionally (read only) to processor 1202. For example, storage 1212 can also include computer-readable media such as magnetic tape, flash memory, PC-CARDS, portable mass storage devices, holographic storage devices, and other storage devices. A fixed mass storage 1220 can also, for example, provide additional data storage capacity. The most common example of mass storage 1220 is a hard disk drive. Mass storage device 1212 and fixed mass storage 1220 generally store additional programming instructions, data, and the like that typically are not in active use by the processor 1202. It will be appreciated that the information retained within mass storage device 1212 and fixed mass storage 1220 can be incorporated, if needed, in standard fashion as part of memory 1210 (e.g., RAM) as virtual memory.

In addition to providing processor 1202 access to storage subsystems, bus 1214 can also be used to provide access to other subsystems and devices. As shown, these can include a display monitor 1218, a network interface 1216, a keyboard 1204, and a pointing device 1206, as well as an auxiliary input/output device interface, a sound card, speakers, and other subsystems as needed. For example, the pointing device 1206 can be a mouse, stylus, track ball, or tablet, and is useful for interacting with a graphical user interface.

The network interface 1216 allows processor 1202 to be coupled to another computer, computer network, or telecommunications network using a network connection as shown. For example, through the network interface 1216, the processor 1202 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 1202 can be used to connect the computer system 1200 to an external network and transfer data according to standard protocols. For example, various process embodiments disclosed herein can be executed on processor 1202, or can be performed across a network such as the Internet, intranet networks, or local area networks, in conjunction with a remote processor that shares a portion of the processing. Additional mass storage devices (not shown) can also be connected to processor 1202 through network interface 1216.

An auxiliary I/O device interface (not shown) can be used in conjunction with computer system 1200. The auxiliary I/O device interface can include general and customized interfaces that allow the processor 1202 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 12 is but an example of a computer system suitable for use with the various embodiments disclosed herein. Other computer systems suitable for such use can include additional or fewer subsystems. In addition, bus 1214 is illustrative of any interconnection scheme serving to link the subsystems. Other computer architectures having different configurations of subsystems can also be utilized.

It should be understood that the devices and methods that are disclosed in the several embodiments provided above can be realized in other ways. For example, the device embodiment described above is merely illustrative. For example, the delineation of units is merely a delineation according to local function. The delineation can take a different form during actual implementation.

The modules described as separate components may or may not be physically separate, and components displayed as modules may or may not be physical modules. They can be located in one place, or they can be distributed across multiple network modules. The embodiment schemes of the present embodiments can be realized by selecting part or all of the modules in accordance with actual need.

Furthermore, the functional modules in the various embodiments of the present invention can be integrated into one processor, or each module can have an independent physical existence, or two or more modules can be integrated into a single module. The aforesaid integrated modules can take the form of hardware, or they can take the form of hardware combined with software function modules.

The modules described above in which the software function modules are integrated can be stored in a computer-readable storage medium. The software function modules described above are stored in a storage medium and include a number of commands whose purpose is to cause a piece of computer equipment (which can be a personal computer, a server, or network computer) or a processor to execute some of the steps in the method described in the various embodiments of the present invention. The storage medium described above encompasses: USB flash drive, mobile hard drive, read-only memory (ROM), random access memory (RAM), magnetic disk, or optical disk, or various other media that can store program code.

In the several embodiments offered in the present application, it should be understood that the disclosed terminal can be realized by other methods. Wherein, the device embodiment described above is merely exemplary; for example, the division of said units or modules is merely one logical functional division thereof, and they may be divided in another manner in actual implementation. For example, multiple units or modules can be combined, or they can be integrated into another system, or some characteristics may be omitted or may not be executed. In addition, the interposed couplings or direct couplings or communication connections that are displayed or discussed may be indirect couplings or communication links that pass through some interfaces, units, or modules. They may be electrical or may take another form.

The units or modules described as separate components above may or may not be physically separate, and the components shown as units or modules may or may not be physical units or physical modules; they may be located in one place, or they may be distributed across multiple network units. The objectives of the embodiment schemes of the present embodiments can be realized by selecting part or all of the units or modules in accordance with actual need.

Furthermore, the functional units or modules in the various embodiments of the present invention can be integrated into one processing unit or module, or each unit or module can have an independent physical existence, or two or more units or modules can be integrated into a single unit or module. The aforesaid integrated units or modules may also take the form of hardware, and they may take the form of software function units or modules.

If the aforesaid integrated units or modules are realized in the form of software function units or modules and sold or used as independent products, they can be stored on a computer-readable storage medium. Based on such an understanding, the essence of the technical scheme of the present invention, or the portion that contributes to the prior art, or all or part of this technical scheme, can be manifested in the form of a software product; this computer software product is stored on a storage medium and includes a number of commands to cause one set of terminal equipment (which can be a personal computer, a server, network equipment, etc.) to execute all or part of the steps of the aforesaid methods in each of the embodiments of the present invention. The storage medium described above encompasses: U discs, read-only memory (ROM), random access memory (RAM), portable hard drives, magnetic disks or optical disks, or various other media that can store program code.

The description above is only a preferred implementation of the present invention. It should be noted that for persons having ordinary skill in the art, improvements and embellishments can also be made without departing from the principles of the present invention, and such improvements and embellishments shall also be considered to be within the scope of protection of the present invention.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    obtaining, by a terminal, an equipment code that uniquely identifies the terminal, wherein the equipment code is based at least in part on one or more characteristic parameters of the terminal;
    generating, by the terminal, a seed key based at least in part on the equipment code, wherein the generating the seed key comprises performing a hash function on at least the equipment code, and the seed key comprises a hash value obtained based at least in part on the hash function performed with respect to at least the equipment code;
    generating, by the terminal, a dynamic password based at least in part on the seed key and an output value of a counter, wherein the dynamic password is a basis for authentication of the terminal by a server; and
    sending, by the terminal, the dynamic password to the server, wherein the server authenticates the dynamic password.

2. The method of claim 1, wherein the obtaining of the equipment code comprises:
    generating, by the terminal, the equipment code based at least in part on the one or more characteristic parameters of the terminal.

3. The method of claim 2, wherein the one or more characteristic parameters comprises one or more of: a brand of the terminal, a model number of the terminal, a serial number of the terminal, an international mobile equipment identity (IMEI) of the terminal, an international mobile subscriber identity (IMSI) of the terminal, a media access control (MAC) address of the terminal, and/or an operating system identifier (ID) of an operating system loaded on the terminal.

4. The method of claim 1, wherein the generating of the seed key comprises:
    generating a symmetric key in accordance with a key generation process, wherein the symmetric key is generated based at least in part on the equipment code, a session identifier (ID) assigned to the terminal by the server, and a user ID (UID) assigned to the terminal by the server; and
    wherein the generating the dynamic password comprises:
        generating the dynamic password based at least in part on the symmetric key and the output value of the counter, in accordance with a password generation process.

5. The method of claim 1, wherein the generating of the seed key comprises:
    generating a symmetric key in accordance with a key generation process, wherein the symmetric key is generated based at least in part on the equipment code, a session identifier (ID) assigned to the terminal by the server, and a user ID (UID) assigned to the terminal by the server, and the key generation process comprises: combining the equipment code, the session ID, and the UID; and
    wherein the generating the dynamic password comprises:
        generating the dynamic password based at least in part on the symmetric key and the output value of the counter, in accordance with a password generation process.

6. The method of claim 1, wherein the generating of the seed key comprises:
    generating a symmetric key in accordance with a key generation process, wherein the symmetric key is generated based at least in part on the equipment code, a session identifier (ID) assigned to the terminal by the server, and a user ID (UID) assigned to the terminal by the server; and
    wherein the generating the dynamic password comprises:
        generating the dynamic password based at least in part on the symmetric key and the output value of the counter, in accordance with a password generation process, the password generation process comprises: setting the dynamic password to HMAC_SHA1(K,C), wherein, HMAC_SHA1( ) is a hash function related to the symmetric key, K represents the symmetric key, and C represents the output value.

7. The method of claim 1, further comprising:
    transmitting, by the terminal, a registration request to the server, wherein the registration request comprises a verification code sent by the server, the equipment code, and a communication code associated with the terminal, and the registration request is received before an authentication request, wherein the terminal sends the dynamic password to the server at least partly in response to the registration request; and
    after said registration request passes verification,
        receiving, by the terminal, a session identifier (ID) assigned to the terminal by the server, and a user ID (UID) assigned to the terminal by the server, wherein the dynamic password is generated based at least in part on the session ID and the UID; and
        maintaining a communication link with the server in connection with an authentication of the terminal.

8. The method of claim 1, further comprising:
    receiving, by the terminal, an authentication request from the server, wherein the terminal receives the authentication request before generating the dynamic password, and the terminal generates the dynamic password in response to a determination that the authentication request is passed verification.

9. The method of claim 1, wherein the output value of the counter corresponds to a time of the terminal.

10. The method of claim 1, wherein the sending of the dynamic password to the server comprises sending the dynamic password without manual entry of the dynamic password to the terminal.

11. The method of claim 1, wherein the dynamic password is generated in response to the terminal receiving an authentication request.

12. A method, comprising:
receiving, by a server, a first dynamic password from a terminal, wherein the first dynamic password corresponds to a password generated by the terminal based at least in part on an output value of a counter of the terminal and a seed key, the seed key having been generated based at least in part on an equipment code that uniquely identifies the terminal, the equipment code is based at least in part on one or more characteristic parameters of the terminal, the seed key is generated based at least in part on a hash function being performed on at least the equipment code, and the seed key comprises a hash value obtained based at least in part on the hash function performed with respect to at least the equipment code;
generating, by the server, a second dynamic password based at least in part on a retrieved equipment code;
determining whether the first dynamic password matches the second dynamic password; and
performing, by the server, an authentication of the terminal based at least in part on whether the first dynamic password and the second dynamic password match.

13. The method of claim 12, further comprising:
transmitting, by the server, a verification request to the terminal, wherein the server transmits the verification request to the terminal before the server generates the second dynamic password; and
receiving, by the server, a verification code and the equipment code transmitted by the terminal based at least in part on the verification request.

14. The method of claim 12, wherein the equipment code is determined based at least in part on the one or more characteristic parameters of the terminal in accordance with a preset algorithm.

15. The method of claim 14, wherein the one or more characteristic parameters comprises one or more of a brand of the terminal, a model number of the terminal, a serial number of the terminal, an international mobile equipment identity (IMEI) of the terminal, an international mobile subscriber identity (IMSI) of the terminal, a media access control (MAC) address of the terminal, and an operating system identifier (ID) of an operating system loaded on the terminal.

16. The method of claim 12, wherein generating the seed key or the generating the second dynamic password comprises:
generating, according to a key generation process, a symmetric key based at least in part on the equipment code, a session identifier (ID) assigned to the terminal by the server, and a user ID (UID) assigned to the terminal by the server; and
wherein the generating the first dynamic password or the second dynamic password comprises: generating, according to a password generation process, the at least one of the first dynamic password and the second dynamic password based at least in part on the symmetric key and the output value.

17. A device, comprising:
one or more processors configured to:
obtain an equipment code that uniquely identifies the device, wherein the equipment code is based at least in part on one or more characteristic parameters of the terminal;
generate a seed key based at least in part on the equipment code, wherein to generate the seed key comprises performing a hash function on at least the equipment code, and the seed key comprises a hash value obtained based at least in part on the hash function performed with respect to at least the equipment code;
generate a dynamic password based at least in part on the seed key and an output value of a counter, wherein the dynamic password is a basis for authentication of the device by a server; and
send the dynamic password to the server, wherein the server authenticates the dynamic password; and
a memory coupled to the one or more processors and configured to provide the one or more processors with instructions.

18. The device of claim 17, wherein the one or more processors are further configured to generate the equipment code based at least in part on the one or more characteristic parameters of the device.

19. A device, comprising:
one or more processors configured to:
receive a first dynamic password from a terminal, wherein the first dynamic password corresponds to a password generated by the terminal based at least in part on an output value of a counter of the terminal and a seed key, the seed key having been generated based at least in part on an equipment code that uniquely identifies the terminal, the equipment code is based at least in part on one or more characteristic parameters of the terminal, the seed key is generated based at least in part on a hash function being performed on at least the equipment code, and the seed key comprises a hash value obtained based at least in part on the hash function performed with respect to at least the equipment code;
generate a second dynamic password based at least in part on a retrieved equipment code;
determine whether the first dynamic password matches the second dynamic password; and
perform an authentication of the terminal based at least in part on whether the first dynamic password and the second dynamic password match; and
a memory coupled to the one or more processors and configured to provide the one or more processors with instructions.

20. The device of claim 19, wherein the equipment code is generated based at least in part on one or more characteristic parameters of the terminal.

21. A computer program product, the computer program product being embodied in a non-transitory computer readable storage medium and comprising computer instructions for:
obtaining an equipment code that uniquely identifies a terminal, wherein the equipment code is based at least in part on one or more characteristic parameters of the terminal;
generating, by the terminal, a seed key based at least in part on the equipment code, wherein the generating the seed key comprises performing a hash function on at least the equipment code, and the seed key comprises a hash value obtained based at least in part on the hash function performed with respect to at least the equipment code;

generating a dynamic password based at least in part on the seed key and an output value of a counter, wherein the dynamic password is a basis for authentication of the terminal by a server; and sending the dynamic password to the server, wherein the server authenticates the dynamic password.

22. A computer program product, the computer program product being embodied in a non-transitory computer readable storage medium and comprising computer instructions for:

receiving, by a server, a first dynamic password from a terminal, wherein the first dynamic password corresponds to a password generated by the terminal based at least in part on an output value of a counter of the terminal and a seed key, the seed key having been generated based at least in part on an equipment code that uniquely identifies the terminal, the equipment code is based at least in part on one or more characteristic parameters of the terminal, the seed key is generated based at least in part on a hash function being performed on at least the equipment code, and the seed key comprises a hash value obtained based at least in part on the hash function performed with respect to at least the equipment code;

generating, by the server, a second dynamic password based at least in part on a retrieved equipment code;

determining whether the first dynamic password matches the second dynamic password; and performing, by the server, an authentication of the terminal based at least in part on whether the first dynamic password and the second dynamic password match.

* * * * *

UNITED STATES PATENT AND TRADEMARK OFFICE
CERTIFICATE OF CORRECTION

| | |
|---|---|
| PATENT NO. | : 10,523,664 B2 |
| APPLICATION NO. | : 15/201084 |
| DATED | : December 31, 2019 |
| INVENTOR(S) | : Zeyang Li |

It is certified that error appears in the above-identified patent and that said Letters Patent is hereby corrected as shown below:

On the Title Page

In page 2, Column 2, item (56), references cited, other publications, Line 6, delete "Singh, Mahima; Garg, Deepak. Choosing Best Hashing Strategies and Hash Functions. 2009 IEEE International Advance Computing Conference. https://ieeexplore.ieee.org/stannp/stannp.jsp?tp=&arnumber=4808979 (Year: 2009)." and insert --Singh, Mahima; Garg, Deepak. Choosing Best Hashing Strategies and Hash Functions. 2009 IEEE International Advance Computing Conference. https://ieeexplore.ieee.org/stamp/stamp.jsp?tp=&arnumber=4808979 (Year: 2009).--

In the Specification

In Column 3, Line 20, delete "HIVID" and insert --HMD--, therefor.

Signed and Sealed this
Twenty-third Day of June, 2020

Andrei Iancu
*Director of the United States Patent and Trademark Office*